United States Patent
Ryu et al.

(10) Patent No.: US 10,483,547 B2
(45) Date of Patent: Nov. 19, 2019

(54) LITHIUM METAL BATTERY

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Saebom Ryu, Suwon-si (KR); Yonggun Lee, Incheon (KR); Joungwon Park, Yongin-si (KR); Toshinori Sugimoto, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 137 days.

(21) Appl. No.: 15/230,593

(22) Filed: Aug. 8, 2016

(65) Prior Publication Data
US 2017/0062829 A1   Mar. 2, 2017

(30) Foreign Application Priority Data

Aug. 31, 2015 (KR) .................. 10-2015-0123206
Jun. 10, 2016 (KR) .................. 10-2016-0072702

(51) Int. Cl.
*H01M 4/62* (2006.01)
*H01M 4/134* (2010.01)
(Continued)

(52) U.S. Cl.
CPC ......... *H01M 4/628* (2013.01); *H01M 4/0402* (2013.01); *H01M 4/134* (2013.01);
(Continued)

(58) Field of Classification Search
None
See application file for complete search history.

(56) References Cited

U.S. PATENT DOCUMENTS 7,354,680 B2   4/2008   Miklaylik
7,358,012 B2   4/2008   Mikhaylik
(Continued)

FOREIGN PATENT DOCUMENTS

DE            290978 A5   2/1987
KR   10-2012-0092055 A   8/2012
(Continued)

OTHER PUBLICATIONS

Ding et al, Dendrite-free lithium deposition via self-healing electrostatic shield mechanism, Feb. 2013, J. Am. Chem. Soc., 135, 4450-4456 (Year: 2013).*
(Continued)

*Primary Examiner* — Daniel S Gatewood
(74) *Attorney, Agent, or Firm* — Cantor Colburn LLP

(57) ABSTRACT

A lithium metal battery including: a lithium metal anode; a protective layer disposed on the lithium metal anode, the protective layer including: a polymer and at least one selected from a metal salt including a Group 1 and Group 2 element and a nitrogen-containing additive; a cathode; and a liquid electrolyte disposed between the protective layer and the cathode, the liquid electrolyte including an organic solvent, wherein the at least one selected from metal salt and a nitrogen-containing additive comprising a Group 1 element or Group 2 element is insoluble in the organic solvent of the liquid electrolyte.

23 Claims, 7 Drawing Sheets

(51) Int. Cl.
*H01M 4/36* (2006.01)
*H01M 4/38* (2006.01)
*H01M 10/052* (2010.01)
*H01M 4/04* (2006.01)
*H01M 10/0525* (2010.01)
*H01M 10/0568* (2010.01)
*H01M 10/0569* (2010.01)
*H01M 4/02* (2006.01)

(52) U.S. Cl.
CPC ........... *H01M 4/366* (2013.01); *H01M 4/382* (2013.01); *H01M 10/052* (2013.01); *H01M 10/0525* (2013.01); *H01M 10/0568* (2013.01); *H01M 10/0569* (2013.01); *H01M 4/62* (2013.01); *H01M 2004/027* (2013.01); *H01M 2220/20* (2013.01); *Y02T 10/7011* (2013.01)

(56) References Cited

U.S. PATENT DOCUMENTS

| | | | |
|---|---|---|---|
| 7,553,590 B2 | 6/2009 | Mikhaylik | |
| 7,842,421 B2 | 11/2010 | Mikhaylik | |
| 8,828,610 B2 | 9/2014 | Mikhaylik | |
| 2005/0274000 A1* | 12/2005 | Oh | H01M 4/5815 29/623.3 |
| 2007/0037058 A1 | 2/2007 | Visco et al. | |
| 2007/0117007 A1* | 5/2007 | Visco | H01M 2/1646 429/144 |
| 2011/0033755 A1* | 2/2011 | Eitouni | H01M 4/134 429/310 |
| 2011/0287305 A1 | 11/2011 | Scordilis-Kelley et al. | |
| 2013/0059193 A1* | 3/2013 | Scordilis-Kelley | H01M 4/62 429/156 |
| 2013/0236764 A1* | 9/2013 | Hu | H01M 10/056 429/127 |
| 2014/0178770 A1 | 6/2014 | Xu et al. | |
| 2015/0056488 A1 | 2/2015 | Zhang et al. | |
| 2016/0329567 A1 | 11/2016 | Lee et al. | |

FOREIGN PATENT DOCUMENTS

| | | |
|---|---|---|
| KR | 10-1382126 B1 | 4/2014 |
| KR | 20160131267 A | 11/2016 |
| WO | 2015-013207 A1 | 1/2015 |

OTHER PUBLICATIONS

Ding et al "Dendrite-Free Lithium Deposition via Self-Healing Electrostatic Shield Mechanism", Journal of the American Chemical Society, 2013, 135, pp. 4450-4456.

Ding et al "Effects of Cesium Cations in Lithium Deposition via Self-Healing Electrostatic Shield Mechanism", The Journal of Physical Chemistry C, 2014, 118(8), pp. 4043-4049.

Kim et al. "Controlled Lithium Dendrite Growth by a Synergistic Effect of Multilayered Graphene Coating and an Electrolyte Additive", Chem. Mater., 2015, 27(8), pp. 2780-2787.

Zhang et al. "Dendrite-Free Lithium Deposition with Self-Aligned Nanorod Structuture", Nano Letters, 2014, 14, pp. 6889-6896.

European Search Report for European Patent Application No. 16181297.9 dated Jan. 25, 2017.

\* cited by examiner

LITHIUM METAL BATTERY

CROSS-REFERENCE TO RELATED APPLICATION

This application claims priority to Korean Patent Application No. 10-2015-0123206, filed on Aug. 31, 2015 and Korean Patent Application No. 10-2016-0072702 filed on Jun. 10, 2016 in the Korean Intellectual Property Office, and all the benefits accruing therefrom under 35 U.S.C. § 119, the content of which is incorporated herein in its entirety by reference.

BACKGROUND

1. Field

The present disclosure relates to a lithium metal battery including a lithium metal anode.

2. Description of the Related Art

A lithium secondary battery is a high-performance battery having the highest energy density among other currently available secondary batteries, which are applicable in various fields, for example, electric vehicles.

A lithium secondary battery may use a lithium thin film as an anode. When a lithium thin film is used as the anode, it may be highly reactive to the liquid electrolyte during charging or discharging due to the high reactivity of lithium, or may lead to dendrite growth on the lithium thin film anode. Accordingly, a lithium secondary battery including such a lithium metal thin film may have reduced lifetime and stability. Therefore, there is a need for a lithium battery having improved cell performance.

SUMMARY

Provided is a lithium metal battery having a protective layer that may suppress formation of lithium dendrite on a surface of a lithium metal anode.

Additional aspects will be set forth in part in the description which follows and, in part, will be apparent from the description, or may be learned by practice of the presented exemplary embodiments.

According to an aspect of an exemplary embodiment, a lithium metal battery includes:

a lithium metal anode;

a protective layer disposed on the lithium metal anode, the protective layer including: i) a polymer and ii) at least one selected from a metal salt including a Group 1 or Group 2 element and a nitrogen-containing additive;

a cathode; and a liquid electrolyte disposed between the protective layer and the cathode, the liquid electrolyte including an organic solvent, wherein the at least one selected from metal salt and a nitrogen-containing additive comprising a Group 1 element or Group 2 element is insoluble in the organic solvent of the liquid electrolyte.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
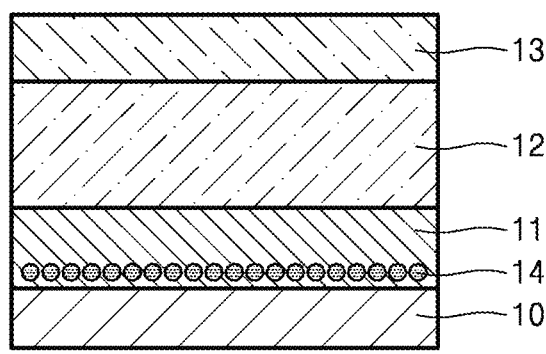
FIG. 1 is a schematic cross-sectional view illustrating a structure of a lithium metal battery according to an embodiment.

Reference will now be made in detail to exemplary embodiments of a lithium metal battery and a method of manufacturing the same, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." As used herein, the terms such as "comprising", "including", "having", or the like are intended to indicate the existence of the features regions, integers, steps, operations, components, and/or elements disclosed in the specification, and are not intended to preclude the possibility that one or more other features or elements may exist or may be added.

It will also be understood that when an element such as a layer, a region or a component is referred to as being "on" another layer or element, it can be directly on the other layer or element, or intervening layers, regions, or components may also be present. In contrast, when an element is referred to as being "directly on" another element, there are no intervening elements present.

In the drawings, the sizes of elements are exaggerated or reduced for ease of description. The size or thickness of each element shown in the drawings are arbitrarily illustrated for better understanding or ease of description, and thus the present disclosure is not limited thereto.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, with reference to attached drawings, a lithium metal battery and a method of preparing the same battery, according to an exemplary embodiment will be described in detail. However, these are for illustrative purposes only and are not intended to limit the scope of this disclosure.

According to an embodiment of the present disclosure, there is provided a lithium metal battery including:

a lithium metal anode;

a protective layer disposed on the lithium metal anode, the protective layer including: a polymer and at least one selected from a Group 1 element- or Group 2 element-containing metal salt and a nitrogen-containing additive;

a cathode; and a liquid electrolyte disposed between the protective layer and the cathode, the liquid electrolyte comprising an organic solvent, wherein the at least one selected from metal salt and a nitrogen-containing additive comprising a Group 1 element or Group 2 element is insoluble in the organic solvent of the liquid electrolyte.

The expression "the at least one selected from metal salt and a nitrogen-containing additive comprising a Group 1 element or Group 2 element is insoluble in the organic solvent of the liquid electrolyte" means that a solubility of the at least one selected from metal salt and a nitrogen-containing additive comprising a Group 1 element or Group 2 element in the organic solvent of the liquid electrolyte at 25° C. is less than 100 parts per million per liter.

The Group 1 element or Group 2 element-containing metal salt may include at least one metal selected from Cs, Rb, K, Ba, Sr, Ca, Na, and Mg. For example, the Group 1 element- or Group 2 element-containing metal salt may be at least one selected from CsTFSI, $CsNO_3$, $CsPF_6$, CsFSI, $CsAsF_6$, $CsClO_4$, $CsBF_4$, RbTFSI, $RbNO_3$, $RbPF_6$, RbFSI, $RbAsF_6$, $RbClO_4$, $RbBF_4$, KTFSI, $KNO_3$, $KPF_6$, KFSI, $KAsF_6$, $KClO_4$, $KBF_4$, NaTFSI, $NaNO_3$, $NaPF_6$, NaFSI, $NaAsF_6$, $NaClO_4$, $NaBF_4$, $Ba(TFSI)_2$, $Ba(NO_3)_2$, $Ba(PF_6)_2$, $Ba(FSI)_2$, $Ba(AsF_6)_2$, $Ba(ClO_4)_2$, $Ba(BF_4)_2$, $Sr(TFSI)_2$, $Sr(NO_3)_2$, $Sr(PF_6)_2$, $Sr(FSI)_2$, $Sr(AsF_6)_2$, $Sr(ClO_4)_2$, $Sr(BF_4)_2$, $Ca(TFSI)_2$, $Ca(NO_3)_2$, $Ca(PF_6)_2$, $Ca(FSI)_2$, $Ca(AsF_6)_2$, $Ca(ClO_4)_2$, $Ca(BF_4)_2$, $Mg(TFSI)_2$, $Mg(NO_3)_2$, $Mg(PF_6)_2$, $Mg(FSI)_2$, $Mg(AsF_6)_2$, $Mg(ClO_4)_2$, and $Mg(BF_4)_2$, wherein TFSI indicates bis(trifluoromethylsulfonyl)imide, and $(FSI)_2$ indicates bis(fluorosulfonyl)imide.

A lithium metal anode has a high electric capacity per unit of weight, and thus may be used to implement a high-capacity battery. However, dendrite growth on the lithium metal anode during deposition/dissolution of lithium ions may cause a short circuit between the cathode and anode. The lithium metal anode is highly reactive and may cause a side reaction with an electrolyte. Thus, it may reduce cycle lifetime of the battery. To address this drawback, a protective layer for protecting the surface of the lithium metal anode may be used.

To suppress the growth of lithium dendrite in a lithium metal battery having a lithium metal anode, adding an additive such as a cesium salt to a liquid electrolyte or using a polymer electrolyte that may serve as an anode protective layer has been suggested.

However, adding an additive such as cesium salt to liquid electrolyte is not practical in a battery system due to the insolubility of cesium salt in the liquid electrolyte. Cesium salt may hinder migration of lithium ions or may take part in electrochemical reaction in the cathode, and consequentially deteriorate cell performance.

Using a polymer electrolyte that may serve as a lithium metal anode protective layer may increase interfacial resistance between the protective layer and the lithium metal anode and consequentially deteriorate cell performance of the lithium metal battery.

In the course of the extensive research, the inventors of the present application have found that the above drawbacks can be addressed by a lithium metal battery including a protective layer on a surface of a lithium metal anode, the protective layer including: a polymer and at least one selected from a Group 1 element- or Group 2 element-containing metal salt and a nitrogen-containing additive.

The at least one selected from a Group 1 element- or Group 2 element-containing metal salt and a nitrogen-containing additive in the protective layer is insoluble in an organic solvent of the liquid electrolyte. For example, a solubility of the nitrogen-containing additive in the organic solvent of the liquid electrolyte at 25° C. is less than 100 parts per million per liter (ppm/L), in some embodiments, less than 75 ppm/L, and in some other embodiments, less than 50 ppm/L. Due to insoluble characteristics, the at least one of the Group 1 element- or Group 2 element-containing metal salt and the nitrogen-containing additive in the protective layer may be stably confined to a surface region of the lithium metal anode with limited mobility, so that migration of lithium ions between electrodes may not be hindered by the protective layer including the at least one of the Group 1 element- or Group 2 element-containing metal salt and the nitrogen-containing additive.

The metal of the Group 1 element- or Group 2 element-containing metal salt has a relatively large atom size than lithium, and thus may cause a steric hindrance effect in the protective layer, thereby suppressing growth of lithium dendrite on the surface of the lithium metal anode. A metal cation (for example, cesium (Cs) or rubidium (Rb) ions) in the Group 1 element- or Group 2 element-containing metal salt may exhibit an effective reduction potential below the reduction potential of lithium ions, and thus may form a positively charged electrostatic shield around the initial growth tip of the protuberances on the surface of the lithium metal anode without reduction or deposition of the metal salt during lithium deposition. The positively charged electrostatic shield may effectively suppress growth of lithium dendrite on the surface of the lithium metal anode. In order for the Group 1 element- or Group 2 element-containing metal salt to have an effective reduction potential below the reduction potential of lithium ions as described above, the amount of the Group 1 element- or Group 2 element-containing metal salt is important. For example, the amount of the Group 1 element- or Group 2 element-containing metal salt may be varied within a range of about 0.1 parts to about 100 parts by weight, based on 100 parts by weight of the polymer in the protective layer.

The protective layer may have good mechanical strength and flexibility to suppress lithium dendrite formation. The lithium metal battery may further include an ion-conductive thin film disposed between the lithium metal anode and the protective layer. The ion-conductive thin film may improve the ionic conductivity of the protective layer and lithium ion mobility (or lithium ion transference number), and consequentially reduce an interfacial resistance between the lithium metal anode and the protective layer. For example, the ion-conductive thin film may include lithium nitride ($Li_3N$).

The protective layer may also chemically improve a deposition/dissolution process of lithium ions, thereby improving deposition morphology of the lithium metal anode compared to the case when a conventional protective layer is formed, and may consequentially increase deposition density on the surface of the lithium metal anode and lithium ion mobility (or transference number). In addition, as described above, the at least one of the Group 1 element- or Group 2 element-containing metal salt and the nitrogen-containing additive is confined to the protective layer on the surface of the lithium metal anode, and thus is unlikely to be dispersed in the liquid electrolyte or to migrate toward the cathode and react with the cathode. As a result, the lithium metal battery including the protective layer may have improved rate capability and lifetime characteristics.

Non-limiting examples of the nitrogen-containing additive in the protective layer may include at least one selected from an inorganic nitrate, an organic nitrate, an inorganic nitrite, an organic nitrite, an organic nitro compound, an organic nitroso compound, an N—O compound, and lithium nitride ($Li_3N$).

For example, the inorganic nitrate may be at least one selected from lithium nitrate, potassium nitrate, cesium nitrate, barium nitrate, and ammonium nitrate. For example, the organic nitrate may be at least one selected from a C1 to C20 dialkyl imidazolium nitrate, guanidine nitrate, ethyl nitrate, propyl nitrate, butyl nitrate, pentyl nitrate, and octyl nitrate. For example, the organic nitrite may be at least one selected from ethyl nitrite, propyl nitrite, butyl nitrite, pentyl nitrite, and octyl nitrite.

For example, the organic nitro compound may be at least one selected from nitromethane, nitropropane, nitrobutane, nitrobenzene, dinitrobenzene, nitrotoluene, dinitrotoluene, and nitropyridine. For example, the N—O compound may be at least one selected from pyridine N-oxide, C1 to C20 alkylpyridine N-oxide, and tetramethyl piperidine N-oxyl (TEMPO).

In some embodiments, the nitrogen-containing additive in the protective layer may be at least one selected from $LiNO_3$ and $Li_3N$, and the Group 1 element- or Group 2 element-containing metal salt in the protective layer may be selected from cesium bis(trifluoromethylsulfonyl)imide (CsTFSI), $CsNO_3$, $CsPF_6$, CsFSI, $CsAsF_6$, $CsClO_4$, and $CsBF_4$. For example, the Group 1 element- or Group 2 element-containing metal salt may be CsTFSI.

The amount of the at least one of the Group 1 element- or Group 2 element-containing metal salt and the nitrogen-containing additive in the protective layer may be from about 0.1 parts to about 100 parts, and in some embodiments, about 0.1 parts to about 30 parts by weight, based on 100 parts by weight of the polymer in the protective layer. While not wishing to be bound by theory, it is understood that when the amount of the at least one of the Group 1 element- or Group 2 element-containing metal salt and nitrogen-containing additive is within any of these ranges, the lithium metal battery may display a lithium dendrite growth suppression effect, a reduced interfacial resistance between the surface of the lithium metal anode and the protective layer, and improved lithium ion mobility.

In some embodiments, the protective layer may include only a Group 1 element- or Group 2 element-containing metal salt. In this regard, the amount of the Group 1 element- or Group 2 element-containing metal salt may be about 0.1 parts to about 100 parts, in some embodiments, about 0.1 parts to about 30 parts by weight, and in some other embodiments about 1 part to about 30 parts by weight, based on 100 parts by weight of the polymer in the protective layer.

In some embodiments, the protective layer may include only a nitrogen-containing additive. In this regard, the amount of the nitrogen-containing additive may be about 0.1 parts to about 100 parts by weight, in some embodiments, about 0.1 parts to about 30 parts by weight, and in some other embodiments about 1 part to about 30 parts by weight, based on 100 parts by weight of the polymer in the protective layer.

In some other embodiments, the protective layer may include both a Group 1 element- or Group 2 element-containing metal salt and a nitrogen-containing additive. In this regard, the amount of the Group 1 element- or Group 2 element-containing metal salt may be about 0.01 parts to about 99.99 parts by weight, in some embodiments, about 0.1 parts to about 30 part by weight, and in some other embodiments about 1 part to about 30 parts by weight, based on 100 parts by weight of the polymer, and the amount of the nitrogen-containing additive may be about 0.01 parts to about 99.99 parts by weight, and in some embodiments, about 0.1 parts to about 30 parts by weight, and in some other embodiments about 1 part to about 30 parts by weight, based on 100 parts by weight of the polymer.

In some embodiments, a mixed weight ratio of the Group 1 element- or Group 2 element-containing metal salt to the nitrogen-containing additive in the protective layer may be about 1:9 to about 9:1, in some other embodiments, about 1:2 to about 2:1, and in some other embodiments, about 1:1. While not wishing to be bound by theory, it is understood that when the mixed weight ratio of the Group 1 element- or Group 2 element-containing metal salt to the nitrogen-containing additive is within any of these ranges, due to good deposition density on the surface of the lithium metal anode and improved lithium ion mobility characteristics of the electrolyte, the lithium metal battery may have improved rate capability and lifetime characteristics.

The protective layer of the lithium metal battery according to any of the above-described embodiments may include a polymer. The polymer may be at least one copolymer selected from a homopolymer, a block copolymer, and a graft copolymer. The polymer may be insoluble, for example, in an organic solvent of the liquid electrolyte. Using a polymer having such characteristics, the protective layer may have good resistance to chemicals in a liquid electrolyte including a carbonate-based organic solvent, unlike conventional polyethylene-based protective layers and is unlikely to crack to suppress a short circuit in the lithium metal battery.

The polymer may be at least one selected from polyvinyl alcohol, polymethylmethacrylate, polymethylacrylate, polyethylmethacrylate, polyethylacrylate, polypropylmethacrylate, polypropylacrylate, polybutylacrylate, polybutylmethacrylate, polypentylmethacrylate, polypentylacrylate, polycyclohexylmethacrylate, polycyclohexylacrylate, polyhexylmethacrylate, polyhexylacrylate, polyglycidylacrylate, polyglycidylmethacrylate, and polyvinylidene fluoride.

The polymer in the protective layer may be a block copolymer including a first polymer block and a second polymer block. The first polymer block may be at least one selected from polystyrene, hydrogenated polystyrene, polymethacrylate, poly(methyl methacrylate), polyvinylpyridine, polyvinyl cyclohexane, polyimide, polyamide, polyethylene, polybutylene, polypropylene, poly(4-methyl-1-pentene), poly(butylene terephthalate), poly(isobutyl methacrylate), poly(ethylene terephthalate), polydimethylsiloxane, polyvinylidene fluoride, polymaleic acid, poly(maleic anhydride), polymethacrylic acid, poly(tert-butyl vinyl ether), poly(cyclohexyl methacrylate), poly(cyclohexyl vinyl ether), and polydivinylbenzene, or a polymer including at least two repeating units of these polymers.

The second polymer block may be at least one selected from polyethylene oxide, polypropylene oxide, polymethylmethacrylate, polyethylmethacrylate, polydimethylsiloxane, polyacrylic acid, polymethacrylic acid, polymethylacrylate, polyethylacrylate, poly-2-ethylhexyl acrylate, polybutyl methacrylate, poly-2-ethylhexylmethacrylate, poly(decyl acrylate), polyethylene vinyl acetate, polyimide, polyamine, polyamide, poly(C1 to C20 alkyl carbonate), polynitrile, polyphosphazine, polyolefin, polydiene, polyisoprene, polybutadiene, polychloroprene, polyisobutylene, polyurethane, polyethylene, polybutylene, and polypropylene.

The first polymer block is a region related with the mechanical properties of the block copolymer, and the second polymer block may be a region related with the ionic conductivity, strength, and/or ductility of the block copolymer.

The block copolymer may be a block copolymer including: i) a structural domain; and ii) at least one selected from an ion-conductive domain, a rubbery domain, and a hard domain. Such block copolymers may have good strength and good flexibility, and thus may be highly effective to physically suppress lithium dendrite growth on the surface of the lithium metal anode. As used herein, the term "structural domain" refers to a region related with the mechanical properties of the block copolymer. As used herein, the term "ion-conductive domain" refers to a region related with the ionic conductivity of the block copolymer. The term "hard domain" refers to a region that contributes to improved mechanical strength of the block copolymer, has hydrophobic and crystalline characteristics, and may also be impregnated with liquid electrolyte, thus providing the protective layer with characteristics of a separator. The "rubbery domain" is a region that ensures the lock copolymer improved strength, ductility, and elasticity at the same time, and that is also stable against a liquid electrolyte including a carbonate-based organic solvent.

In some embodiments, the structural domain of a block copolymer may include a first polymer block of the block copolymer, and at least one selected from the ion-conductive domain, rubbery domain, and hard domain of the block copolymer may include at least one second polymer block of the block copolymer selected from: i) an ion-conductive block, ii) a rubbery block, and iii) a hard block. The first polymer block may include a plurality of structural repeating units, and the second polymer block may include at least one selected from a plurality of ion-conductive repeating unit, a plurality of rubbery repeating unit, and a plurality of olefin repeating unit. For example, the ion-conductive block may include at least one selected from polyethylene oxide, polypropylene oxide, polymethylmethacrylate, polyethylmethacrylate, polydimethylsiloxane, polyacrylic acid, polymethacrylic acid, polymethylacrylate, polyethylacrylate, poly-2-ethylhexyl acrylate, polybutyl methacrylate, poly-2-ethylhexylmethacrylate, poly(decyl acrylate), polyethylene vinyl acetate, polyimide, polyamine, polyamide, poly(C1 to C20 alkyl carbonate), polynitrile, and polyphosphazines.

In some embodiments, the rubbery block of the block copolymer may include at least one selected from polyisoprene, polybutadiene, polychloroprene, polyisobutylene, and polyurethane. The hard block of the block copolymer may include at least one selected from polyethylene, polybutylene, polyisobutylene, and polypropylene.

In some embodiments, the first polymer block of the block copolymer may have a weight average molecular weight of 10,000 Daltons or greater, in some embodiments, about 10,000 Daltons to about 500,000 Daltons, and in some other embodiments, about 15,000 Daltons to about 400,000 Daltons. The second polymer block may have a weight average molecular weight of about 10,000 Daltons or greater, in some embodiments, about 10,000 Daltons to about 500,000 Daltons, and in some other embodiments, about 15,000 Daltons to about 400,000 Daltons. While not wishing to be bound by theory, it is understood that when the first and second polymer blocks of the block polymer have a weight average molecular weight within any of these ranges, the protective layer may have improved ductility, elasticity, and strength characteristics.

The amount of the first polymer block in the block copolymer may be about 20 parts to about 50 parts, in some embodiments, about 22 parts to about 30 parts by weight, and in some other embodiments, about 25 parts to about 30 parts by weight, based on 100 parts by weight of a total weight of the block polymer. While not wishing to be bound by theory, it is understood that when the amount of the first polymer block is within any of these ranges, the protective layer may have improved mechanical properties such as strength.

In some embodiments, the block copolymer may be at least one selected from a diblock copolymer (A-B) and a triblock copolymer (A-B-A' or B-A-B'). The blocks A and A' are a plurality of first polymer blocks forming a structural domain, and the blocks B and B' are second polymer blocks.

In some embodiments, when the polymer in the protective layer is a block copolymer, the block copolymer may be, for example, a block copolymer including: i) a polystyrene first block, and ii) at least one second block selected from polyisoprene and polybutadiene;

a block copolymer including: i) a polystyrene first block, ii) at least one second block selected from polyisoprene and polybutadiene, and iii) a polystyrene third block;

a block copolymer including: i) at least one first block selected from polystyrene and polymethylmethacrylate, and ii) at least one second block selected from polyethylene and polybutylene;

a block copolymer including: i) at least one first block selected from polystyrene and polymethylmethacrylate, ii) at least one second block selected from polyethylene and polybutylene, and iii) at least one third block selected from polystyrene and polymethylmethacrylate;

a block copolymer including: i) a polystyrene first block and ii) a second block including a reaction product of at least one selected from polyethylene glycol diacrylate and polyethylene glycol dimethacrylate, and polyethylene oxide;

a block copolymer including: i) a polystyrene first block, ii) a second block including a reaction product of at least one selected from polyethylene glycol diacrylate and polyethylene glycol dimethacrylate, and polyethylene oxide, and iii) a polystyrene third block;

a block copolymer including: i) a polystyrene first block, and ii) a second block including a reaction product of at least one selected from trimethylolpropane triacrylate and trimethylolpropane trimethacrylate, and polyethylene oxide;

a block copolymer including: i) a polystyrene first block, ii) a second block including a reaction product of at least one selected from trimethylolpropane triacrylate and trimethylolpropane trimethacrylate, and polyethylene oxide, and iii) a polystyrene third block;

a block copolymer including: i) a polystyrene first block, and ii) a second block including a reaction product of at least one selected from polyethylene glycol diacrylate and polyethylene glycol dimethacrylate with polyhedral oligomeric silsesquioxane (POSS) having an acryl group, and polyethylene oxide;

a block copolymer including: i) a polystyrene first block, ii) a second block including a reaction product of at least one selected from polyethylene glycol diacrylate and polyethylene glycol dimethacrylate with POSS having an acryl group, and polyethylene oxide, and iii) a polystyrene third block;

a block copolymer including: i) a polystyrene first block, and ii) a second block including a reaction product of at least one selected from trimethylolpropane triacrylate and trimethylolpropane trimethacrylate with POSS having an acryl group; or a block copolymer including: i) a polystyrene first block, ii) a second block including a reaction product of at least one selected from trimethylolpropane triacrylate and trimethylolpropane trimethacrylate with POSS having an acryl group, and polyethylene oxide, and iii) a polystyrene third block.

When the block copolymer includes a first block, a second block, and a third block, the total amount of the first and third blocks may be about 20 parts to about 35 parts by weight, and in some embodiments, about 22 parts to about 30 parts by weight, and in some other embodiments, about 25 parts to about 30 parts by weight, based on 100 parts by weight of a total weight of the block copolymer, and the amount of the second block may be about 65 parts to about 80 parts, in some embodiments, about 70 parts to about 78 parts by weight, and in some other embodiments, about 72 parts to about 75 parts by weight, based on 100 parts by weight of a total weight of the block copolymer. A mixed weight ratio of the first polymer block to the second polymer block in the block copolymer may be about 1:1 to about 1:9, in some embodiments, about 1:1 to about 1:7, and in some embodiments, about 1:1 to about 1:4. While not wishing to be bound by theory, it is understood that when the mixed weight ratio of the first polymer block to the second polymer block in the block copolymer is within any of these ranges, the protective layer may have good mechanical characteristics without reduction in ductility and tensile modulus characteristics, and may effectively suppress growth of lithium dendrite.

In some embodiments, the block copolymer in the protective layer may include at least one first block selected from polystyrene, polymethylmethacrylate, and polyacrylonitrile, and at least one second block selected from polyisoprene, polyethylene, and polybutylene.

In some other embodiments, the block copolymer in the protective layer may include at least one first block selected from polystyrene, polymethylmethacrylate, and polyacrylonitrile, and at least one second block selected from polyethylene oxide and polysiloxane.

For example, the block copolymer in the protective layer may be a polystyrene-b-polyisoprene-polystyrene block copolymer.

In some embodiments, the block copolymer in the protective layer may have a weight average molecular weight of about 10,000 Daltons to about 500,000 Daltons.

In some embodiments, the liquid electrolyte in the lithium metal battery may include a lithium salt and an organic solvent. Non-limiting examples of the organic solvent are a carbonate compound, a glyme compound, and a dioxolane compound. For example, the carbonate compound may be selected from ethylene carbonate, propylene carbonate, dimethyl carbonate, fluoroethylene carbonate, diethyl carbonate, and ethylmethyl carbonate. The glyme compound may be, for example, at least one selected from poly(ethylene glycol) dimethyl ether, tetra(ethylene glycol)dimethyl ether, tri(ethylene glycol)dimethyl ether, poly(ethylene glycol)dilaurate, poly(ethylene glycol) monoacrylate, and poly(ethylene glycol)diacrylate.

The dioxolane compound may be, for example, at least one selected from 3-dioxolane, 4,5-diethyl-dioxolane, 4,5-dimethyl-dioxolane, 4-methyl-1,3-dioxolane, and 4-ethyl-1,3-dioxolane. For example, the organic solvent may be selected from 2,2-dimethoxy-2-phenyl acetophenone, 1,2-dimethoxyethane (DME), 1,2-diethoxy ethane, tetrahydrofuran, gamma-butyrolactone, and 1,1,2,2-tetrafluoroethyl 2,2,3,3-tetrafluoropropyl ether.

For example, the organic solvent of the liquid electrolyte in the lithium metal battery according to any of the above-described embodiments may include at least one selected from ethylene carbonate, dimethyl carbonate, diethyl carbonate, ethylmethyl carbonate, fluoroethylene carbonate, 1,2-dimethoxy ethane, 1,2-diethoxyethane, dimethylene glycol dimethyl ether, trimethylene glycol dimethyl ether, triethylene glycol dimethylether, tetraethylene glycol dimethyl ether, polyethylene glycol dimethyl ether, succinonitrile, sulfolane, dimethyl sulfone, ethyl methyl sulfone, diethyl sulfone, adiponitrile, and 1,1,2,2-tetrafluoroethyl 2,2,3,3-tetrafluoropropyl ether. The polymer in the protective layer according to any of the above-described embodiments may be insoluble in these organic solvents.

For example, the lithium salt in the liquid electrolyte may be at least one selected from LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiAlO$_2$, LiAlCl$_4$, LiCl, LiI, LiSbF$_6$, LiPF$_3$(CF$_2$CF$_3$)$_3$, LiPF$_3$(CF$_3$)$_3$, and LiB(C$_2$O$_4$)$_2$. For example, the amount of the lithium salt in the liquid electrolyte may be about 0.01 M to about 2.0 M.

In some embodiments, the protective layer may further include at least one selected from an inorganic particle, an ionic liquid, a polymer ionic liquid, and an oligomer.

In some embodiments, the protective layer may further include a lithium salt. The amount of the lithium salt in the protective layer may be about 10 parts to about 70 parts by weight, in some embodiments, about 15 parts to about 60 parts by weight, and in some embodiments, about 20 parts to about 50 parts by weight, based on 100 parts by weight of the polymer in the protective layer. While not wishing to be bound by theory, it is understood that when the amount of the lithium salt in the protective layer is within any of these ranges, the protective layer may have improved ionic conductivity.

In some embodiments, the protective layer may have an elongation at about 25° C. of about 500% or greater, and in some embodiments, about 600% or greater, and in some other embodiments, about 1,000% to about 1,500%. While not wishing to be bound by theory, it is understood that when the protective layer has an elongation within any of these ranges, the protective layer may have good ductility to suppress the growth of dendrite on the surface of the lithium metal anode, and efficiently suppress a volumetric change of the lithium metal anode.

The inorganic particle may include at least one selected from a metal hydroxide, a metal carbonate, a metal carboxylate, a metal silicate, a metal aluminosilicate, a metal carbide, a metal nitride, a metal halide, a metal nitrate, a carbon oxide, a carbonaceous material, and an organic-inorganic composite. The inorganic particle may be at least one selected from SiO$_2$, a cage-structured silsesquioxane, TiO$_2$, ZnO, Al$_2$O$_3$, BaTiO$_3$, and a metal-organic framework (MOF). When the protective layer further includes any of these organic particles, the protective layer may have improved mechanical properties. The inorganic particle may have an average particle diameter of about 1 micrometer (μm) or less, in some embodiment, about 1 nanometer (nm) to about 500 nm, and in some other embodiments, about 1 nm to about 100 nm. For example, the inorganic particle may have an average particle diameter of about 1 nm to about 100 nm, in some embodiments, about 10 nm to about 100 nm, and in some other embodiments, about 30 nm to about 70 nm. While not wishing to be bound by theory, it is understood that when the average particle diameter of the inorganic particle is within any of these ranges, it may be possible to form a protective layer having improved film formability and improved mechanical properties without deterioration in ionic conductivity.

For example, the cage-structured silsesquioxane may be a polyhedral oligomeric silsesquioxane (POSS). The number of silicon atoms in the POSS may be about 8 or less, for example, 6 or 8. For example, the cage-structured silsesquioxane may be a compound represented by Formula 1.

$$Si_kO_{1.5k}(R^1)_a(R^2)_b(R^3)_c \qquad \text{Formula 1}$$

In Formula 1, R$^1$, R$^2$, and R$^3$ may be each independently selected from a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, and a silicon-containing functional group.

In Formula 1, 0<a<20, 0<b<20, 0<c<20, and k=a+b+c, provided that a, b, and c are selected in such a way that 6≤k≤20.

The cage-structured silsesquioxane may be selected from a compound represented by Formula 2 and a compound represented by Formula 3.

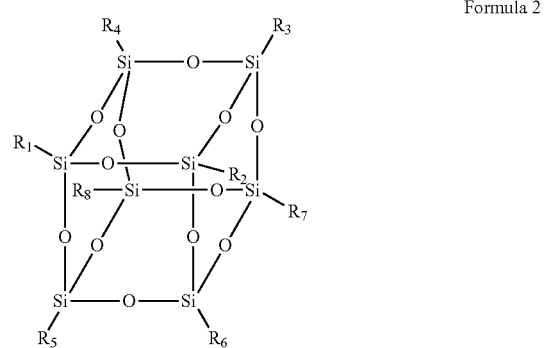

Formula 2

In Formula 2, R$_1$ to R$_8$ may be each independently selected from a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, and a silicon-containing functional group.

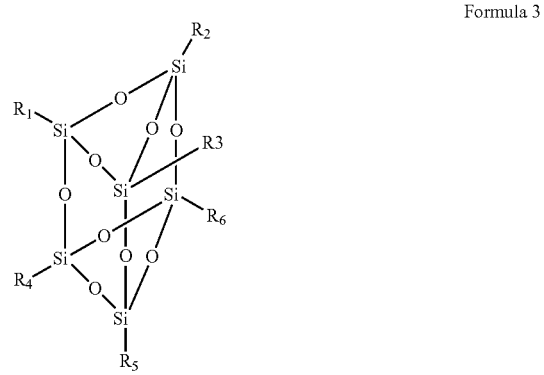

Formula 3

In Formula 3, $R_1$ to $R_6$ may be each independently selected from a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, and a silicon-containing functional group.

In some embodiments, $R_1$ to $R_8$ in Formula 2 and $R_1$ to $R_6$ in Formula 3 may be an isobutyl group. For example, the cage-structured silsesquioxane may be octaisobutyl-t8-silsesquioxane.

When the protective layer includes inorganic particles, the amount of the inorganic particles may be in a range of about 1 part to about 40 parts by weight, in some embodiments, about 3 parts to about 30 parts by weight and in some embodiments, about 5 parts to about 20 parts by weight, based on 100 parts by weight of the polymer. While not wishing to be bound by theory, it is understood that when the amount of the inorganic particles is within any of these ranges, the protective layer may have improved mechanical characteristics and improved ionic conductivity.

The metal-organic framework (MOF) may be a porous crystalline compound in which a Group 2 to Group 15 metal ion or a Group 2 to Group 15 metal ionic cluster is chemically bonded with an organic ligand. The organic ligand refers to an organic group that may form an organic bond such as coordinate bond, ionic bond, or covalent bond. For example, an organic group having at least two binding sites for such metal ions as described above may form a stable structure through binding with the metal ions.

The Group 2 to Group 5 metal ion may be at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi). The organic ligand may be a group derived from at least one of compounds selected from an aromatic dicarboxylic acid, an aromatic tricarboxylic acid, an imidazole-based compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, and a compound having at least one functional group selected from an amino group, an imino group, an amide group, a dithio carboxylic acid group ($-CS_2H$), a dithio carboxylate group ($-CS_2^-$), a pyridine group, and a pyrazine group.

Non-limiting examples of the aromatic dicarboxylic acid and the aromatic tricarboxylic acid are benzene dicarboxylic acid, benzene tricarboxylic acid, biphenyl dicarboxylic acid, and terphenyl-dicarboxylic acid.

For example, the organic ligand may be a group originating from compounds represented by Formulas 4.

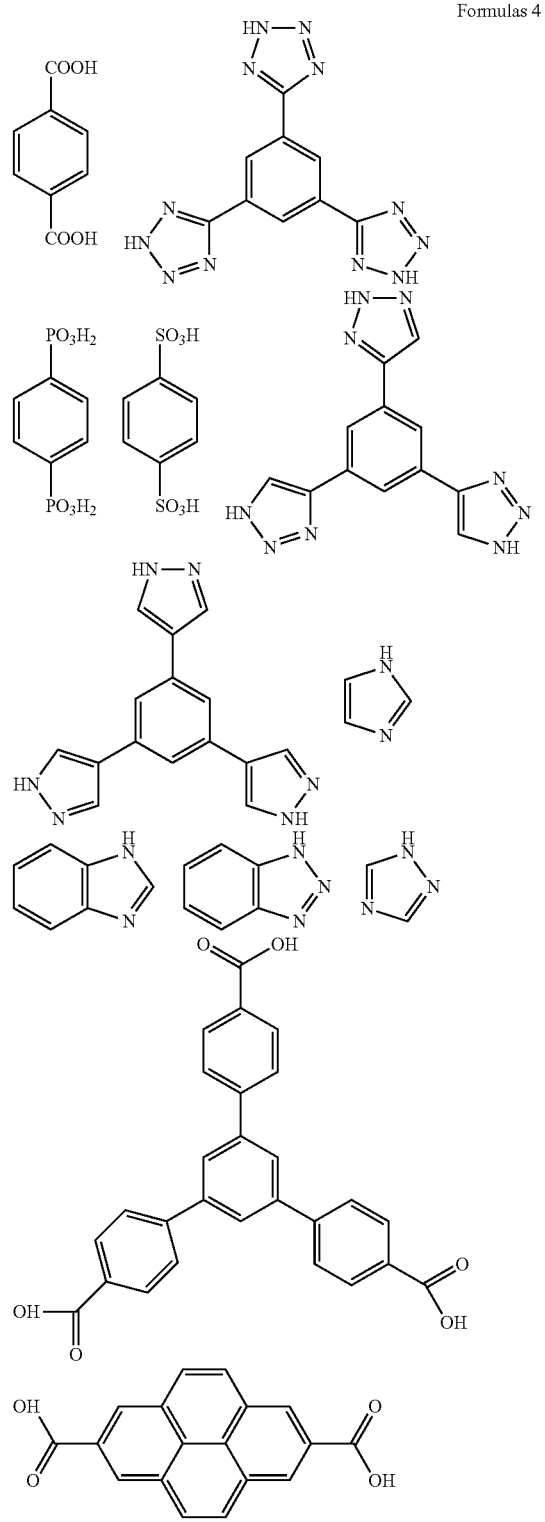

Formulas 4

The metal-organic framework (MOF) may be, for example, selected from $Ti_8O_8(OH)_4[O_2C-C_6H_4-CO_2]_6$, $Cu(bpy)(H_2O)_2(BF_4)_2(bpy)$ {bpy=4, 4'-bipyridine}, $Zn_4O(O_2C-C_6H_4-CO_2)_3$ (Zn-terephthalic acid-MOF, Zn-MOF), and $Al(OH)\{O_2C-C_6H_4-CO_2\}$.

The ionic liquid refers to a salt in a liquid state at room temperature or a fused salt at room temperature that consists of only ions having a melting point below equal to or below room temperature. The ionic liquid may be at least one compound each including:

i) a cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

The inorganic particles may have various shapes. For example, the inorganic particle may have a spherical shape, an elliptical shape, a cubical shape, a tetrahedral shape, a pyramidal shape, an octahedral shape, a cylindrical shape, a polygonal pillar-like shape, a conical shape, a columnar shape, a tubular shape, a helical shape, a funnel shape, a dendrite shape, or any of various common regular and irregular shapes.

In some embodiments, the ionic liquid may be at least one selected from N-methyl-N-propylpyrrolidinium bis(trifluoromethylsulfonyl)imide, N-butyl-N-methyl-pyrrolidinium bis(3-trifluoromethylsulfonyl)imide, 1-butyl-3-methyl-imidazolium bis(trifluoromethylsulfonyl)imide, and 1-ethyl-3-methyl-imidazolium bis(trifluoromethylsulfonyl)imide. The amount of the ionic liquid may be in a range of about 5 parts to about 40 parts by weight, in some embodiments, about 7 parts to about 30 parts by weight, and in some embodiments, about 10 parts to about 20 parts by weight, based on 100 parts by weight of the polymer in the protective layer. While not wishing to be bound by theory, it is understood that when the amount of the ionic liquid is within any of these ranges, the protective layer may have improved ionic conductivity and improved mechanical properties.

When the protective layer includes an ionic liquid and a lithium salt, a mole ratio (IL/Li) of the ionic liquid to lithium ions may be in a range of about 0.1 to about 2.0, in some embodiments, about 0.2 to about 1.8, and in some other embodiments, about 0.4 to about 1.5. While not wishing to be bound by theory, it is understood that when the mole ratio of the ionic liquid to lithium ions is within any of these ranges, the protective layer may have high lithium ion mobility, high ionic conductivity, and improved mechanical properties to effectively suppress growth of lithium dendrite on a surface of a lithium metal anode.

The polymer ionic liquid may be, for example, a polymerization product of ionic liquid monomers, or a polymeric compound. The polymer ionic liquid is highly soluble in an organic solvent, and thus may further improve the ionic conductivity of the electrolyte when further added.

When the ionic liquid is a polymeric ionic liquid obtained by polymerization of ionic liquid monomers as described above, a resulting product from the polymerization reaction may be washed and dried, and may be subsequently subjected to an anionic substitution reaction to prepare an appropriate anode that may improve solubility in an organic solvent In some embodiments, the polymer ionic liquid may include a repeating unit that includes:

i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In some embodiments, the ionic liquid monomers may have a functional group polymerizable such as a vinyl group, an allyl group, an acrylate group, and a methacrylate group, and may include a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and at least one of the above-listed anions.

Non-limiting examples of the ionic liquid monomers are selected from 1-vinyl-3-ethylimidazolium bromide, a compound represented by Formula 5, and a compound represented by Formula 6.

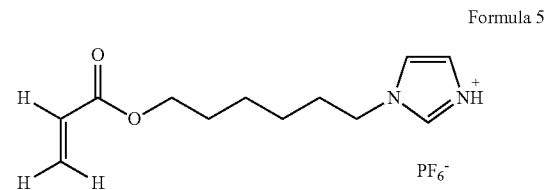

Formula 5

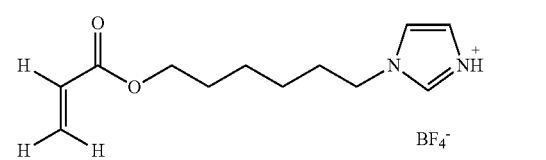

Formula 6

For example, the polymer ionic liquid may be selected from a compound represented by Formula 7 and a compound represented by Formula 8.

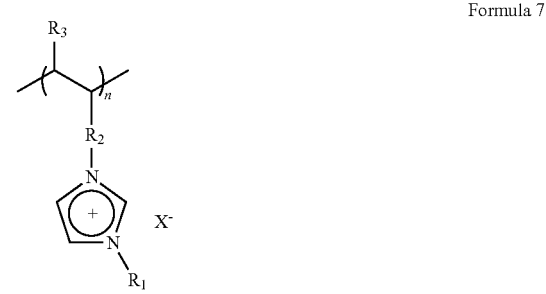

Formula 7

In Formula 7, $R_1$ and $R_3$ may be each independently selected from a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, and a substituted or unsubstituted C4-C30 carbocyclic group;

X⁻ indicates an anion of the ionic liquid;

$R_2$ may be a chemical bond, a C1-C30 alkylene group, a C6-C30 arylene group, a C2-C30 heteroarylene group or a C4-C30 carbocyclic group, and n may be from 500 to about 2,800.

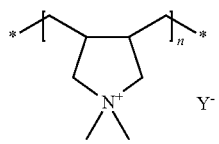

Formula 8

In Formula 8, Y⁻ may be as defined the same as X⁻ in Formula 7; and n may be in a range of 500 to 2,800.

For example, in Formula 8, r may be selected from bis(trifluoromethylsulfonyl)imide (TFSI), bis(fluorosulfonyl)imide, $BF_4$, and $CF_3SO_3$.

The polymer ionic liquid may include, for example, a cation selected from poly(1-vinyl-3-alkylimidazolium), poly (1-allyl-3-alkylimidazolium), poly(1-(methacryloyloxy-3-alkylimidazolium), wherein "alkyl" is a C1 to C20 alkyl group, and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3C\ F_2SO_2)_2N^-$, $C_4F_9SO_3^-$, $C_3F_7COO^-$, and $(CF_3SO_2)(CF_3CO)N^-$.

For example, the compound of Formula 8 may be polydiallyldimethyl ammonium bis(trifluoromethylsulfonyl) imide.

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethyleneglycol dimethylether (polyglyme), tetraethyleneglycol dimethyl ether (tetraglyme), and triethyleneglycol dimethylether (triglyme).

The low-molecular weight polymer may have a weight average molecular weight of about 75 to about 2,000, for example, a weight average molecular weight of about 250 to about 500. The thermally stable ionic liquid may be the same as those listed above in conjunction with the above-described ionic liquid. The lithium salt may be any of the compounds described above as alkali metal salts as long as it includes lithium as an alkali metal.

In some embodiments, the oligomer in the protective layer may be at least one selected from polyethylene glycol dimethyl ether and polyethylene glycol diethyl ether. The oligomer may have a weight average molecular weight of about 200 to about 2,000. The amount of the oligomer may be about 5 parts to about 50 parts by weight, in some embodiments about 3 parts to about 30 parts by weight, and in some embodiments about 5 parts to about 25 parts by weight, based on 100 parts by weight of the polymer in the protective layer. When such an oligomer is further added, the protective layer may have further improved film formability, mechanical properties, and ionic conductivity characteristics.

The protective layer may have an ionic conductivity at about 25° C. of about 1×10⁻⁴ Siemens per centimeter (S/cm) or greater, in some embodiments, about 5×10⁻⁴ S/cm or greater, and in some other embodiments, about 1×10⁻³ S/cm or greater. The protective layer may have a tensile modulus at about 25° C. of about 10 megaPascals (MPa) or greater, in some embodiments, about 10 MPa to about 80 MPa, and in some embodiments, about 10 MPa to about 50 MPa. The protective layer may have an elongation at about 25° C. of about 500% or greater, and in some embodiments, about 600% or greater, and in some other embodiments, about 1,200% or greater or about 1,300%. Thus, the protective layer, even at about 25° C., may have improved mechanical characteristics, including tensile modulus and ductility characteristics, and improved ionic conductivity that are both satisfactory for battery performance. While not wishing to be bound by theory, it is understood that when the elongation of the protective layer is within any of these ranges, the protective layer may effectively suppress a volumetric change in the lithium metal anode. When the elongation of the protective layer is lower than these ranges, the protective layer may more likely be damaged by the dendrite grown on the lithium metal, and thus cause a short circuit. In some embodiments, the protective layer may have both improved tensile modulus and ductility characteristics as described above to suppress a volumetric change in the lithium metal anode, and consequently effectively suppress the growth of dendrite.

In some embodiments, the protective layer may have a tensile strength at about 25° C. of about 2.0 MPa or greater. In some embodiments, an interfacial resistance at about 25° C. of the protective layer with respect to the lithium metal that is obtained from a Nyquist plot through an impedance measurement may be about 10% or more smaller than the resistance of bare lithium metal. In some embodiments, since the interfacial resistance between the protective layer and the lithium metal electrode is lower than when bare lithium metal is used alone, the protective layer may have improved interfacial characteristics. In some embodiments, the protective layer may have an oxidation current or reduction current of about 0.05 milliAmperes per square centimeter (mA/cm²) or less in a voltage range of about 0.0 Volts (V) to about 6.0 V with respect to lithium metal.

In some embodiments, the lithium metal battery may have a lithium deposition density on the surface of the lithium metal anode of about 0.2 grams per cubic centimeter (g/cc) to about 0.4 g/cc, and in some embodiments, about 0.26 g/cc to about 0.32 g/cc.

Figure 2:
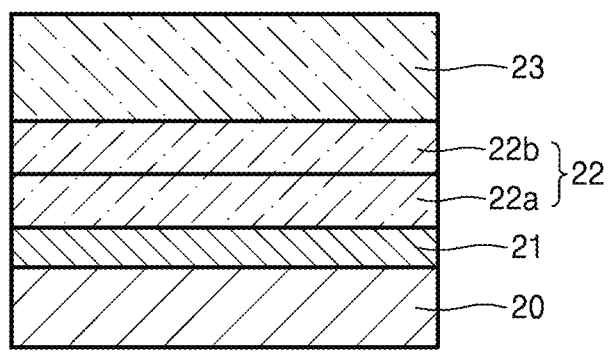
FIG. 2 is a schematic cross-sectional view illustrating a structure of a lithium metal battery according to another embodiment.

FIGS. 1 and 2 are schematic views illustrating structure of lithium metal batteries according to embodiments.

Referring to FIG. 1, a lithium metal battery according to an embodiment includes a protective layer 11 according to any of the above-described embodiments on a lithium metal anode 10. A liquid electrolyte 12 is disposed between the protective layer 11 and a cathode 13. The protective layer 11 may include at least one of a Group 1 element- or Group 2 element-containing metal salt and a nitrogen-containing additive that are insoluble in an organic solvent of the liquid electrolyte 12 as described above. As illustrated in FIG. 1, the at least one of a Group 1 element- or Group 2 element-containing metal salt and a nitrogen-containing additive 14 may be in a region of the protective layer 11 adjacent to the lithium metal anode 10. In some embodiments, the at least one of a Group 1 element- or Group 2 element-containing metal salt and a nitrogen-containing additive 14 may be distributed in the overall region of the protective layer, and the amount thereof may increase toward a region of the protective layer closer to the lithium metal anode 10. Although the at least one of a Group 1 element- or Group 2 element-containing metal salt and a nitrogen-containing additive is illustrated in FIG. 1 to be in a region adjacent to the lithium metal anode 10, embodiments of the present disclosure are not limited thereto.

Referring to FIG. 2, a lithium metal battery according to another embodiment may include a protective layer 21 on a lithium metal anode 20. The lithium metal battery may include a two-layer stack structure including a liquid electrolyte 22a and a solid electrolyte 22b that are sequentially stacked on the protective layer 21 upon one another. As illustrated in FIG. 2, the liquid electrolyte 22a may be adjacent to the protective layer 21. However, the stack order of the liquid electrolyte 22a and the solid electrolyte 22b may be switched. A cathode 23 may be on the solid electrolyte 22b. An electrolyte 22 includes the liquid electrolyte 22a and the solid electrolyte 22b.

In the embodiment of FIG. 2, a gel electrolyte instead of the solid electrolyte 22b may be used.

In some embodiments, the lithium metal battery may further include a separator. The separator may be a monolayer or a multilayer including at least two layers of polyethylene, polypropylene, and polyvinylidene fluoride. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

In FIGS. 1 and 2, the cathodes 13 and 23 may be a porous cathode. The porous cathode may be a cathode including pores, or any cathode that allows permeation of liquid electrolyte thereinto by a capillary action.

For example, the porous cathode may be a cathode that may be obtained by coating a cathode active material composition including a cathode active material, a conducting agent, a binder, and a solvent, and drying the resulting structure. The resulting cathode may include pores among particles of the cathode active material. The porous cathode may be impregnated with a liquid electrolyte.

In some embodiments, the cathodes 13 and 23 may include a liquid electrolyte, a gel electrolyte, a solid electrolyte, or the like. The liquid electrolyte, the gel electrolyte, and the solid electrolyte may be any electrolyte available for a lithium battery in the art that does not react with the cathode active material, and thus prevents deterioration of the cathode active material during charging and discharging.

In some embodiments, the protective layer may be suitable for use in a high-voltage lithium metal battery, for example, having a charging voltage of about 4.0 V to about 5.5 V.

Hereinafter, a method of manufacturing a lithium metal battery according to one of the above-described embodiments will be described.

A polymer, at least one selected from a Group 1 element- or Group 2 element-containing metal salt and a nitrogen-containing additive, and an organic solvent may be mixed together to obtain a protective layer-forming composition. Subsequently, the protective layer-forming composition may be coated on a lithium metal anode and dried to form a protective layer on a surface of the lithium metal anode. The drying may be performed at, for example, about 25° C. to about 60° C.

The organic solvent used in the protective layer-forming composition may be any organic solvent available in the art. For example, the organic solvent may be at least one selected from tetrahydrofuran, N-methylpyrrolidone, acetonitrile, benzonitrile, 2-methyl tetrahydrofuran, γ-butyrolactone, dioxolane, 4-methyldioxolane, N,N-dimethylformamide, N,N-dimethyl acetamide, dimethyl sulfoxide, dioxane, 1,2-dimethoxyethane, 1,2-diethoxyethane, sulfolane, dichloroethane, chlorobenzene, nitrobenzene, diethyleneglycol, and dimethyl ether. The amount of the organic solvent may be about 100 parts to about 4,000 parts by weight, for example, about 500 parts to about 2,000 parts by weight, based on 100 parts by weight of the polymer.

At least one selected from an inorganic particle, an ionic liquid, a polymer ionic liquid, and an oligomer may be further added to the protective layer-forming composition.

The coating of the protective layer-forming composition may be performed by using any coating method available to form a protective layer in the art, for example, spin coating, roll coating, curtain coating, extruding, casting, screen printing, inkjet printing, or doctor blading.

The protective layer formed through the above-described processes may be electrochemically stable in a voltage range of about 0 V to about 6.0 V, in some embodiments, about 2.0 V to about 5.0 V, and in some embodiments, about 4.0 V to about 5.0 V. In some embodiments, the protective layer may have an electrochemically stable wide voltage window, and thus may be applicable in an electrochemical device operating at high voltage.

In some embodiments, a current density of the protective layer that results from side reactions, not from deposition/dissolution of lithium, at a voltage of about 0 V may be about 0.05 mA/cm$^2$ or less, in some embodiments, about 0.001 mA/cm$^2$ to about 0.02 mA/cm$^2$, and in some other embodiments, about 0.001 mA/cm$^2$ to about 0.01 mA/cm$^2$. For example, a current density of the protective layer that results from oxidation reaction at a voltage of about 5.0 V with respect to lithium may be about 0.05 mA/cm$^2$ or less, and in some embodiments, about 0.001 mA/cm$^2$ to about 0.04 mA/cm$^2$ or less, and in some other embodiments, about 0.001 mA/cm$^2$ to about 0.02 mA/cm$^2$ or less.

In some embodiments, the lithium metal battery may include a mixed electrolyte, not only a liquid electrolyte as described above, further including at least one selected from a solid electrolyte, a gel electrolyte, and a polymer ionic liquid, in addition to the liquid electrolyte. In some embodiments, the lithium metal battery may further include a separator. The inclusion of at least one selected from a solid electrolyte and a gel electrolyte in the lithium metal battery as described above may further improve the conductivity and mechanical characteristics of the protective layer.

The gel electrolyte may be any electrolyte in gel form known in the art. For example, the gel electrolyte may include a polymer and a polymer ionic liquid. For example, the polymer may be a solid graft (block) copolymer electrolyte.

The solid electrolyte may be, for example, an organic solid electrolyte or an inorganic solid electrolyte. Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyvinylidene fluoride, and polymers including ionic dissociative groups.

Non-limiting examples of the inorganic solid electrolyte are $Li_3N$, $LiI$, $Li_5NI_2$, $Li_3N.LiI.LiOH$, $Li_2SiS_3$, $Li_4SiO_4$, $Li_4SiO_4.LiI.LiOH$, $Li_3PO_4.Li_2S.SiS_2$, $Cu_3N$, $LiPON$, $Li_2S.GeS_2.Ga_2S_3$, $Li_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein M is a rare earth element, such as Nd, Gd, Dy, or the like), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x$ $(Ge_{1-y}Ti_y)_{2-x}(PO_4)_3$ (wherein $0 \leq x \leq 0.8$, $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (wherein $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), and $Li_{7+x}A_xLa_{3-x}Zr_2O_{12}$ (wherein $0 < x < 3$, and A is Zn).

In some embodiments, the lithium metal anode of the lithium metal battery may be a lithium metal thin film electrode or a lithium metal alloy electrode.

A lithium metal alloy for the lithium metal anode may include lithium, and a metal/metalloid alloyable with lithium, an alloy thereof, or an oxide thereof. Examples of the metal/metalloid alloyable with lithium, an alloy thereof, or an oxide thereof are at least one selected from Si, Sn, Al, Ge, Pb, Bi, Sb, a Si—Y' alloy (wherein Y' is at least one selected from an alkali metal, an alkaline earth metal, a Group 13 to Group 16 element, a transition metal, and a rare earth element, except for Si), a Sn—Y" alloy (wherein Y" is at least one selected from an alkali metal, an alkaline earth metal, a Group 13 to Group 16 element, a transition metal, and a rare earth element except for Sn), and $MnO_x$ (wherein $0 < x \leq 2$). Y' and Y" may be at least one selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), and polonium (Po).

A cathode active material for the cathode may include at least one selected from lithium cobalt oxide, lithium nickel cobalt manganese oxide, lithium nickel cobalt aluminum oxide, lithium iron phosphate, and lithium manganese oxide, but is not limited thereto. Any cathode active material available in the art may be used.

For example, the cathode active material may be a compound represented by one of the following formulas: $Li_aA_{1-b}B'_bD'_2$ (wherein $0.90 \leq a \leq 1.8$ and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulas above, A is at least one selected from nickel (Ni), cobalt (Co), and manganese (Mn); B' is at least one selected from aluminum (Al), nickel (Ni), cobalt (Co), manganese (Mn), chromium (Cr), iron (Fe), magnesium (Mg), strontium (Sr), vanadium (V), and a rare earth element; D' is at least one selected from oxygen (O), fluorine (F), sulfur (S), and phosphorus (P); E is at least one selected from cobalt (Co), and manganese (Mn); F' is at least one selected from fluorine (F), sulfur (S), and phosphorus (P); G is at least one selected from aluminum (Al), chromium (Cr), manganese (Mn), iron (Fe), magnesium (Mg), lanthanum (La), cerium (Ce), strontium (Sr), and vanadium (V); Q is at least one selected from titanium (Ti), molybdenum (Mo), and manganese (Mn); I' is at least one selected from chromium (Cr), vanadium (V), iron (Fe), scandium (Sc), and yttrium (Y); and J is at least one selected from vanadium (V), chromium (Cr), manganese (Mn), cobalt (Co), nickel (Ni), and copper (Cu).

For example, the cathode active material may be a compound represented by Formula 9, a compound represented by Formula 10, or a compound represented by Formula 11.

$$Li_aNi_bCo_cMn_dO_2 \qquad \text{Formula 9}$$

In Formula 9, $0.90 \leq a \leq 1.8$, $0 \leq b \leq 0.9$, $0 \leq c \leq 0.5$, and $0 \leq d \leq 0.5$.

$$Li_2MnO_3 \qquad \text{Formula 10}$$

$$LiMO_2 \qquad \text{Formula 11}$$

In Formula 11, M may be selected from Mn, Fe, Co, and Ni.

The cathode of the lithium metal battery may be manufactured as follows.

A cathode active material, a binder, and a solvent are mixed to prepare a cathode active material composition. A conducting agent may be further added into the cathode active material composition. The cathode active material composition is directly coated on a metallic current collector and dried to prepare a cathode plate. Alternatively, the cathode active material composition may be cast on a separate support to form a cathode active material film, which may then be separated from the support and then laminated on a metallic current collector to prepare a cathode plate.

The current collector may comprise a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any alloy thereof, or a conductive film prepared by dispersing a conductive material in a rubber or a resin such as styrene-ethylene-butylene-styrene copolymer (SEBS). For example, aluminum, nickel, or stainless steel may be used. Particularly, aluminum may be used since it can be easily processed into a thin film and is inexpensive. A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

The binder is a composition which binds with an active material and a conductive material and which binds with a current collector. The amount of the binder added may be from about 1 part to about 50 parts by weight, based on 100 parts by weight of the total weight of the cathode active material. Non-limiting examples of the binder include polyvinylidene fluoride (PVDF), polyvinyl alcohol, carboxymethylcellulose (CMC), starch, hydroxypropylcellulose, reproduced cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, and various copolymers. The amount of the binder may be from about 2 parts to about 5 parts by weight, based on 100 parts by weight of the total weight of the cathode active material. While not wishing to be bound by theory, it is understood that when the content of the binder is within this range, a binding force of the active material layer to the current collector may be satisfactory.

The conducting agent may be any material that does not cause chemical change in the lithium metal battery and have conductivity. Non-limiting examples of the conducting agent include graphite such as natural graphite or artificial graphite; carbonaceous materials, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive material, such as a polyphenylene derivative.

The amount of the conducting agent may be from about 1 part to about 10 parts by weight, for example, from about 2 parts to about 5 parts by weight, based on 100 parts by weight of the total weight of the cathode active material. While not wishing to be bound by theory, it is understood that when the amount of the conducting agent is within any of these ranges, the final cathode may have good conductivity characteristics.

A non-limiting example of the solvent is N-methylpyrrolidone.

The amount of the solvent may be from about 100 parts to about 2,000 parts by weight, based on 100 parts by weight of the cathode active material. While not wishing to be bound by theory, it is understood that when the amount of the solvent is within this range, a process for forming the active material layer may be easily carried out.

For example, the lithium metal battery according to any one of the above-described embodiments may have improved capacity and improved lifetime characteristics, and thus may be used in a battery cell for use as a power source of a small device, and may also be used as a unit battery of a medium-large size battery pack or battery module that include a plurality of battery cells for use as a power source of a medium-large size device. The lithium metal battery according to any one of the above-described embodiments may have good voltage characteristics, high capacity, and high energy density, and thus is currently in wide use in mobile phones, laptop computers, storage batteries for power generating units using wind power or sunlight, electric vehicles, uninterruptable power supplies (UPS), household storage batteries, and the like.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

As used herein, the term "alkyl" refers to a completely saturated branched or unbranched (or straight-chained or linear) hydrocarbon group. Non-limiting examples of the "alkyl" group are methyl, ethyl, n-propyl, iso-propyl, n-butyl, iso-butyl, sec-butyl, n-pentyl, iso-pentyl, neo-pentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" indicates fluorine, bromine, chloride, and iodine.

As used herein, the term "alkenyl" group indicates a branched or unbranched hydrocarbon having at least one carbon-carbon double bond. Non-limiting examples of the alkenyl group are vinyl, aryl, butenyl, iso-propenyl, and iso-butenyl. At least one hydrogen atom in the alkenyl group may be substituted with any of the substituents for the alkyl group as described above.

As used herein, the term "alkynyl" indicates a branched or unbranched hydrocarbon having at least one carbon-carbon triple bond. Non-limiting examples of the "alkynyl" group are ethynyl, butynyl, iso-butynyl, and propynyl. At least one hydrogen atom of the "alkynyl" group may be substituted with any of the substituents for the alkyl group as described above.

The term "aryl" is construed as including a group with an aromatic ring fused to at least one carbocyclic group. Non-limiting examples of the "aryl" group are phenyl, naphthyl, and tetrahydronaphthyl. At least one hydrogen atom of the "aryl" group may be substituted with any of the substituents for the alkyl group as described above.

As used herein, the term "heteroaryl" group indicates a monocyclic or bicyclic organic compound including at least one heteroatom selected from nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyridine-2-yl, pyridine-3-yl, pyrazine-2-yl, pyrazine-4-yl, pyrazine-5-yl, pyrimidine-2-yl, pyrimidine-4-yl, or pyrimidin-5-yl.

The term "heteroaryl" indicates a heteroaromatic ring fused to at least one of an aryl group, a cycloaliphatic group, and a heterocyclic group.

As used herein, the term "carbocyclic" group indicates a saturated or partially unsaturated non-aromatic monocyclic, bicyclic or tricyclic hydrocarbon group. Non-limiting examples of the monocyclic hydrocarbon group are cyclopentyl, cyclopentenyl, cyclohexyl, and cyclohexenyl. Non-limiting examples of the bicyclic hydrocarbon group are bornyl, decahydronaphthyl, bicyclo[2.1.1]hexyl, bicyclo[2.2.1]heptyl, bicyclo[2.2.1]heptenyl, or bicyclo[2.2.2]octyl A non-limiting example of the tricyclic hydrocarbon is adamantyl.

As used herein, the term "heterocyclic" group indicates a C5-20 cyclic group, for example, C5-C10 cyclic group, including at least one hetero atom. For example, the at least one hetero atom is selected from S, N, O, and B.

As used herein, the terms "alkoxy," "aryloxy," and "heteroaryloxy" indicate alkyl, aryl, and heteroaryl, respectively, each bound to oxygen atom.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1-C30 alkyl" refers to a C1-C30 alkyl group substituted with C6-C30 aryl group, the total number of carbon atoms in the resulting aryl substituted alkyl group is C7-C60.

Thereinafter, one or more embodiments of the present disclosure will be described in detail with reference to the following examples. However, these examples are not intended to limit the scope of the one or more embodiments of the present disclosure.

EXAMPLES

Example 1

Manufacture of Lithium Metal Battery

A polystyrene-b-polyisoprene-b-polystyrene block copolymer (available from Polymer Source) was added to anhydrous tetrahydrofuran to obtain a 5 percent by weight (wt %)-block copolymer-including mixture. The block copolymer of the block copolymer-including mixture included a polystyrene block, a polyisoprene block, and a polystyrene block in a mixed ratio of about 11:78:11 by weight, and had a weight average molecular weight of about 100,000 Daltons.

5 wt % of $Li_3N$, 5 wt % of CsTFSI, and 200 wt % of $Al_2O_3$ (having an average particle diameter of about 10 nanometers, nm) were added to the block copolymer-including mixture to obtain a protective layer-forming composition. The amount of $Li_3N$ was about 5 parts by weight, based on 100 parts by weight of the block copolymer, and the amount of CsTFSI was about 5 parts by weight, based on 100 parts by weight of the block copolymer.

The protective layer-forming composition was coated on a lithium metal thin film (having a thickness of about 20 micrometers, μm) to a thickness of about 3 μm with a doctor blade, and then dried at about 25° C., thereby forming a lithium metal anode with a protective layer (having a thickness of about 3 μm) on the lithium metal thin film.

$LiCoO_2$, a conducting agent (Super-P, available from Timcal Ltd.), polyvinylidene fluoride (PVdF), and N-methylpyrrolidone were mixed together to obtain a cathode composition. A mixed weight ratio of $LiCoO_2$, the conducting agent, and polyvinylidene fluoride (PVdF) in the cathode composition was about 97:1.5:1.5.

The cathode composition was coated on an aluminum foil (having a thickness of about 15 μm), dried at about 25° C., and then further dried at about 110° C. in a vacuum to manufacture a cathode. The cathode had a discharge capacity per unit area of about 3.5 milliAmpere hours per square centimeter ($mAh/cm^2$).

The cathode and the lithium metal anode (having a thickness of about 20 μm) were assembled with a polyethylene separator (having a porosity of about 48%) disposed therebetween to manufacture a lithium metal battery (coin cell). A liquid electrolyte was added between the cathode and the lithium metal anode. The liquid electrolyte used was an electrolyte including 1.0 molar (M) $LiN(SO_2F)_2$ (hereinafter, "LiFSI") dissolved in a mixed solvent of 1,2-dimethoxyethane (DME) and 1,1,2,2-tetrafluoroethyl 2,2,3,3-tetrafluoropropyl ether (TTE) in a volume ratio of about 2:8.

Example 2

Manufacture of Lithium Metal Battery

A lithium metal battery was manufactured in the same manner as in Example 1, except that $LiNO_3$, instead of $Li_3N$, was used to prepare the protective layer-forming composition.

Example 3

Manufacture of Lithium Metal Battery

A lithium metal battery was manufactured in the same manner as in Example 1, except that the amounts of $Li_3N$ and CsTFSI used to prepare the protective layer-forming composition were each about 0.05 parts by weight, based on 100 parts by weight of the block copolymer.

Example 4

Manufacture of Lithium Metal Battery

A lithium metal battery was manufactured in the same manner as in Example 1, except that the amounts of $Li_3N$ and CsTFSI used to prepare the protective layer-forming composition were each about 50 parts by weight, based on 100 parts by weight of the block copolymer.

Example 5

Manufacture of Lithium Metal Battery

A lithium metal battery was manufactured in the same manner as in Example 2, except that the amounts of $LiNO_3$ and CsTFSI used to prepare the protective layer-forming composition were each about 0.05 parts by weight, based on 100 parts by weight of the block copolymer.

Example 6

Manufacture of Lithium Metal Battery

A lithium metal battery was manufactured in the same manner as in Example 2, except that the amounts of $LiNO_3$ and CsTFSI used to prepare the protective layer-forming composition were each about 50 parts by weight, based on 100 parts by weight of the block copolymer.

Example 7

Manufacture of Lithium Metal Battery

A lithium metal battery was manufactured in the same manner as in Example 1, except that a mixed weight ratio of $Li_3N$ to CsTFSI used to prepare the protective layer-forming composition was about 1:2.

Example 8

Manufacture of Lithium Metal Battery

A lithium metal battery was manufactured in the same manner as in Example 2, except that a mixed weight ratio of LiNO$_3$ to CsTFSI used to prepare the protective layer-forming composition was about 1:2.

Examples 9 and 10

Manufacture of Lithium Metal Battery

Lithium metal batteries were manufactured in the same manner as in Example 1, except that ethyl nitrate and nitromethane were used, respectively, instead of Li$_3$N, to prepare the protective layer-forming composition.

Example 11

Manufacture of Lithium Metal Battery

A lithium metal battery was manufactured in the same manner as in Example 1, except that Li$_3$N was not added to prepare the protective layer-forming composition.

Example 12

Manufacture of Lithium Metal Battery

A lithium metal battery was manufactured in the same manner as in Example 1, except that CsTFSI was not added and LiNO$_3$, instead of Li$_3$N, was used to prepare the protective layer-forming composition.

Example 13

Manufacture of Lithium Metal Battery

A lithium metal battery was manufactured in the same manner as in Example 1, except that polyvinyl alcohol, instead of polystyrene-b-polyisoprene-b-polystyrene block copolymer, was used to prepare the protective layer-forming composition.

Example 14

Manufacture of Lithium Metal Battery

A lithium metal battery was manufactured in the same manner as in Example 2, except that SiO$_2$, instead of Al$_2$O$_3$, was used to prepare the protective layer-forming composition.

Example 15

Manufacture of Lithium Metal Battery

Lithium metal batteries were manufactured in the same manner as in Example 1, except that pyridine N-oxide was used, instead of Li$_3$N, to prepare the protective layer-forming composition.

Example 16

Manufacture of Lithium Metal Battery

Lithium metal batteries were manufactured in the same manner as in Example 2, except that NaTFSI was used, instead of CsTFSI, to prepare the protective layer-forming composition.

Example 17

Manufacture of Lithium Metal Battery

Lithium metal batteries were manufactured in the same manner as in Example 2, except that Mg(TFSI)$_2$ was used, instead of CsTFSI, to prepare the protective layer-forming composition.

Comparative Example 1

Manufacture of Lithium Metal Battery

LiCoO$_2$, a conducting agent (Super-P, available from Timcal Ltd.), polyvinylidene fluoride (PVdF), and N-methylpyrrolidone were mixed together to obtain a cathode composition. A mixed weight ratio of LiCoO$_2$, the conducting agent, and PVdF in the cathode composition was about 97:1.5:1.5.

The cathode composition was coated on an aluminum foil (having a thickness of about 15 μm), dried at about 25° C., and then further dried at about 110° C. in a vacuum to manufacture a cathode.

The cathode and a lithium metal thin film (having a thickness of about 20 μm) were assembled with a polypropylene separator (having a thickness of about 12 μm and a porosity of about 48%) disposed therebetween and using a liquid electrolyte to manufacture a lithium metal battery (coin cell). The liquid electrolyte used was an electrolyte including 1.0 M LiFSI dissolved in a mixed solvent of 1.2-dimethoxyethane (DME) and 1,1,2,2-tetrafluoroethyl 2,2,3,3-tetrafluoropropyl ether (TTE) in a volume ratio of about 2:8.

Comparative Example 2

Manufacture of Lithium Metal Battery

A polymer electrolyte (having a thickness of about 200 μm) was formed using a mixture of 20 moles (mol) of polyethylene oxide, 1 mol of lithium bis(trifluoromethane sulfonyl) imide (LiTFSI), and 1 mol of CsTFSI.

The polymer electrolyte was deposited on a lithium metal thin film (having a thickness of about 20 μm) to form a lithium metal anode.

LiCoO$_2$, a conducting agent (Super-P, available from Timcal Ltd.), polyvinylidene fluoride (PVdF), and N-methylpyrrolidone were mixed together to obtain a cathode composition. A mixed weight ratio of LiCoO$_2$, the conducting agent, and PVdF in the cathode composition was about 97:1.5:1.5.

The cathode composition was coated on an aluminum foil (having a thickness of about 15 μm), dried at about 25° C., and then further dried at about 110° C. in a vacuum to manufacture a cathode.

The cathode and the lithium metal anode were assembled with a polyethylene/polypropylene separator disposed therebetween to manufacture a lithium metal battery (coin cell). A liquid electrolyte was added between the cathode and the lithium metal anode. The liquid electrolyte used was an electrolyte including 1.0 M LiFSI dissolved in a mixed solvent of 1.2-dimethoxyethane (DME) and 1,1,2,2-tetrafluoroethyl 2,2,3,3-tetrafluoropropyl ether (TTE) in a volume ratio of about 2:8.

It was found that the lithium metal battery of Comparative Example 2 did not significantly suppressed formation of lithium dendrite during charging and discharging, and thus had an increased interfacial resistance between the protective layer and a surface of the lithium metal anode. The lithium metal battery of Comparative Example 2 also had a very small lithium ion mobility that is too small to implement a cell capacitance required under evaluation example conditions.

Comparative Example 3

Manufacture of Lithium Metal Battery

A lithium metal battery was manufactured in the same manner as in Comparative Example 1, except that $Li_3N$ and CsTFSI were added to a liquid electrolyte prepared by dissolving 1.3 M $LiPF_6$ as a lithium salt in a mixed solvent of ethylene carbonate, diethyl carbonate, and fluoroethylene carbonate in a volume ratio of about 2:6:2. The amounts of $Li_3N$ and CsTFSI were each about 5 parts by weight, based on 100 parts by weight of a total weight of the liquid electrolyte.

$Li_3N$ and CsTFSI added to the liquid electrolyte had poor solubility in the carbonate-based organic solvent of the liquid electrolyte. As a result, it was failed to appropriately perform initial charging of the lithium metal battery of Comparative Example 3 and obtain a lifetime plot.

Comparative Example 4

Manufacture of Lithium Metal Battery

A polystyrene-b-polyisoprene-b-polystyrene block copolymer (available from Polymer Source) was added to anhydrous tetrahydrofuran to obtain a 5 wt %-block copolymer-including mixture. The block copolymer of the block copolymer-including mixture included a polystyrene block, a polyisoprene block, and a polystyrene block in a mixed ratio of about 11:78:11 by weight, and had a weight average molecular weight of about 100,000 Daltons.

200 wt % of $Al_2O_3$ (having an average particle diameter of about 10 nm) was added to the block copolymer-including mixture, which was then coated on a lithium metal thin film (having a thickness of about 20 μm) with a doctor blade, and then dried at about 25° C., thereby forming a lithium metal anode with a protective layer (having a thickness of about 3 μm) on the lithium metal thin film.

$LiCoO_2$, a conducting agent (Super-P, available from Timcal Ltd.), polyvinylidene fluoride (PVdF), and N-methylpyrrolidone were mixed together to obtain a cathode composition. A mixed weight ratio of $LiCoO_2$, the conducting agent, and PVdF in the cathode composition was about 97:1.5:1.5.

The cathode composition was coated on an aluminum foil (having a thickness of about 15 μm), dried at about 25° C., and then further dried at about 110° C. in a vacuum to manufacture a cathode. The cathode had a discharge capacity per unit area of about 3.5 $mAh/cm^2$.

The cathode and the lithium metal anode were assembled with a polyethylene separator (having a thickness of about 12 μm and a porosity of about 48%) disposed therebetween to manufacture a lithium metal battery (coin cell). A liquid electrolyte was added between the cathode and the lithium metal anode. The liquid electrolyte used was an electrolyte including 1.0 M LiFSI dissolved in a mixed solvent of 1,2-dimethoxyethane (DME) and 1,1,2,2-tetrafluoroethyl 2,2,3,3-tetrafluoropropyl ether (TTE) in a volume ratio of about 2:8.

Evaluation Example 1

Scanning Electron Microscopy (SEM)

After each of the lithium metal batteries of Example 2 and Comparative Example 1 was charged with a constant current of 0.1 C at about 25° C. until a voltage of about 4.40 Volts (V) (with respect to Li), a surface status of the lithium metal anode was analyzed by scanning electron microscopy (SEM).

Figure 3A:
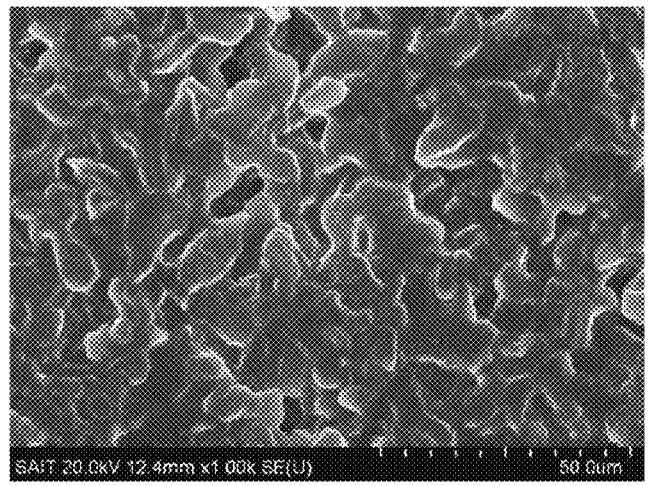
FIGS. 3A and 3B are scanning electron microscopic (SEM) images of lithium metal anode surfaces of a lithium metal battery of Example 2 and a lithium metal battery of Comparative Example 1 after charging at 0.1 C, respectively.
Figure 3B:
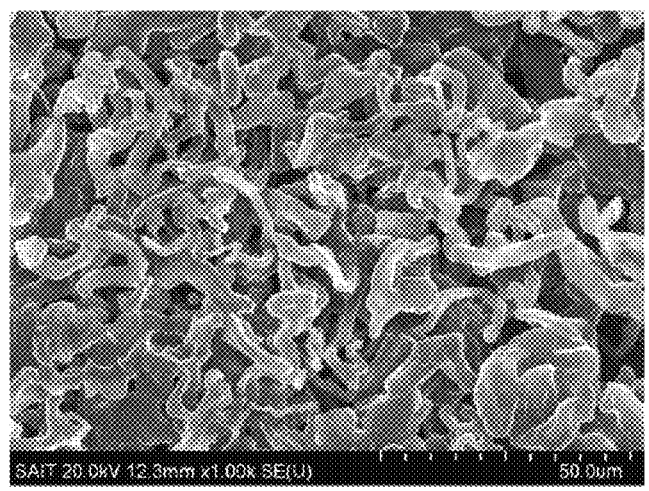

The SEM analysis results are shown in FIGS. 3A and 3B. FIGS. 3A and 3B are SEM images of a lithium metal anode surface of the lithium metal battery of Example 2 and a lithium metal anode surface of the lithium metal battery of Comparative Example 1, respectively.

Referring to FIGS. 3A and 3B, the lithium metal battery of Example 2 was found to have less formation of lithium dendrite on the lithium metal (anode) surface, compared to the lithium metal battery of Comparative Example 1.

Each of the lithium metal batteries of Example 2 and Comparative Example 1 was charged with a constant current of 0.1 C (0.38 $mA/cm^2$) at about 25° C. until a voltage of about 4.40 V (with respect to Li), and maintained at a constant voltage of 4.40 V (constant voltage mode) until a cutoff current of 0.05 C rate. This one-time charging was followed by SEM to analyze a cross-sectional status of the lithium metal anode surface.

Figure 4A:
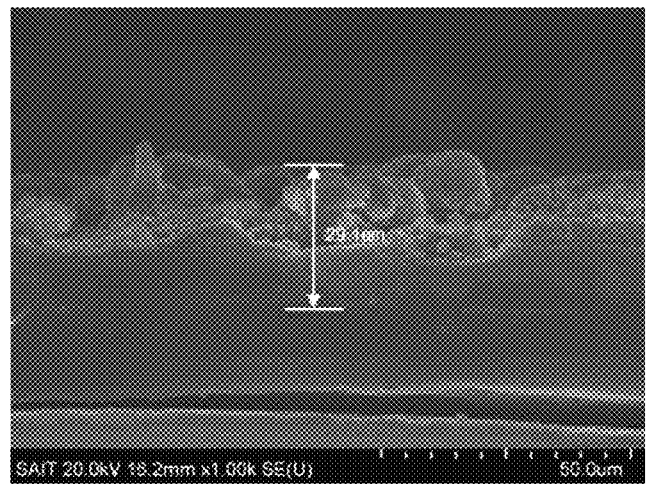
FIGS. 4A and 4B are SEM images of lithium metal anode cross-sections of the lithium metal batteries of Example 2 and Comparative Example 1 after charging at 0.1 C, respectively.
Figure 4B:
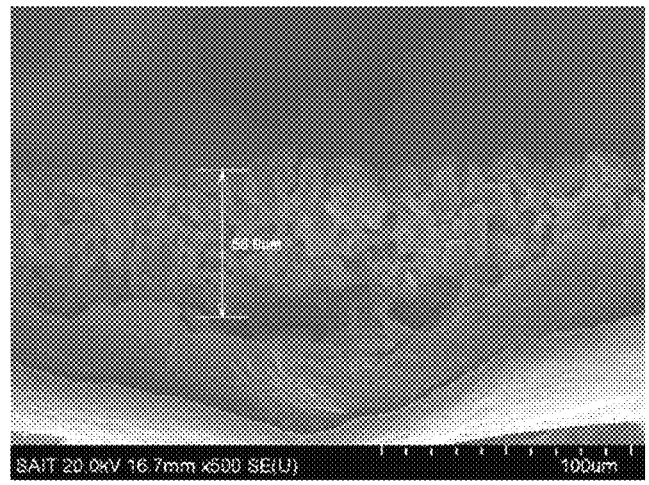

The SEM analysis results are shown in FIGS. 4A and 4B. FIGS. 4A and 4B are SEM images of a cross-sectional lithium metal anode surface of the lithium metal battery of Example 2 and a cross-sectional lithium metal anode surface of the lithium metal battery of Comparative Example 1, respectively.

Referring to FIGS. 4A and 4B, the lithium metal battery of Comparative Example 1 had a lithium metal anode thickness of about 58.9 μm after charging, while the lithium metal battery of Example 2 had a smaller lithium metal anode thickness of about 29.1 μm after charging, compared to that of the lithium metal battery of Comparative Example 1. These results indicate that the lithium metal battery of Example 2 underwent less volumetric change during charging and discharging, compared to the lithium metal battery of Comparative Example 1.

Evaluation Example 2

Lithium Deposition Density

Each of the lithium metal batteries of Examples 2, 11, 12, 16, 17, Comparative Example 1, and Comparative Example 4 was charged with a constant current of 0.1 C (0.38 $mA/cm^2$) at about 25° C. until a voltage of about 4.40 V (with respect to Li), and maintained at a constant voltage of 4.40 V (constant voltage mode) until a cutoff current of 0.05 C rate. This one-time charging was followed by measuring a deposition density of lithium on the lithium metal anode surface.

The results of the deposition density measurement are shown in Table 1.

TABLE 1

| Example | Lithium deposition density (g/cc) |
| --- | --- |
| Example 2 | 0.31-0.32 |
| Example 11 | 0.27-0.30 |
| Example 12 | 0.26-0.28 |

TABLE 1-continued

| Example | Lithium deposition density (g/cc) |
|---|---|
| Example 16 | 0.26-0.27 |
| Example 17 | 0.27-0.29 |
| Comparative Example 1 | 0.18-0.19 |
| Comparative Example 4 | 0.24-0.25 |

Referring to Table 1, the lithium metal batteries of Examples 2, 11, 12, 16, and 17 had a higher lithium deposition density than the lithium metal batteries of Comparative Examples 1 and 4, indicating that the lithium metal batteries of Examples 2, 11, 12, 16, and 17 have improved lithium dendrite suppression performance compared to the lithium metal batteries of Comparative Examples 1 and 4.

Evaluation Example 3

Impedance Measurement

Impedance measurements were performed on the lithium metal batteries of Example 2 and Comparative Example 1 with a Solartron 1260A Impedance/Gain-Phase Analyzer in a frequency range of about 0.1 Hertz (Hz) to about 1 megaHertz (MHz) and an amplitude of about ±10 milliVolts (mV), to measure resistance at about 25° C. by a 2-probe method.

Figure 5:
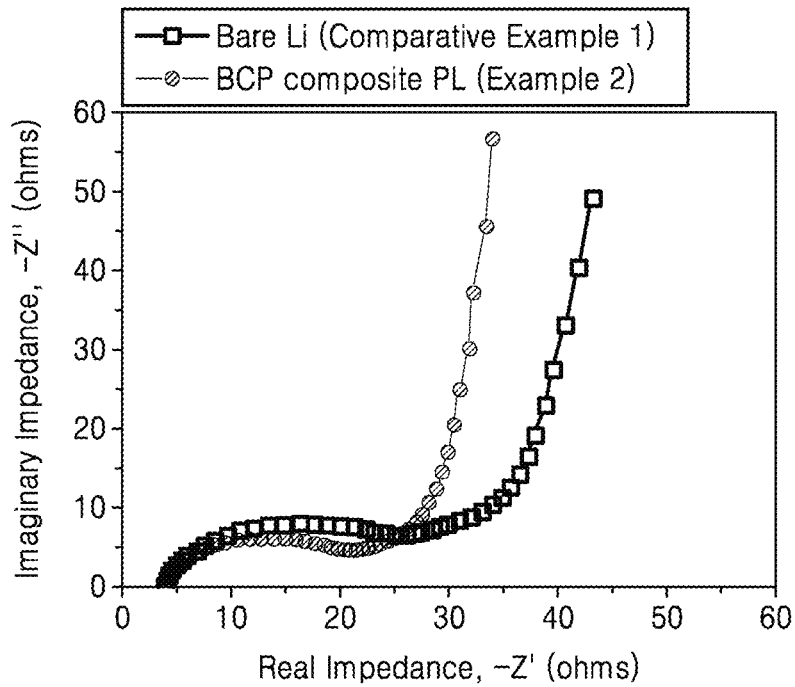
FIG. 5 is a graph of imaginary impedance, $-Z''$ (Ohms, $\Omega$) versus real impedance, $Z'$ (Ohms, $\Omega$) illustrating the results of impedance analysis of the lithium metal batteries of Example 2 and Comparative Example 1.

Nyquist plots obtained from the impedance measurements that were performed after 24 hours from the manufacture of the lithium metal batteries of Example 2 and Comparative Example 1 are shown in FIG. 5. In FIG. 5, an interfacial resistance between the lithium metal electrode and the protective layer depends from the positions and sizes of semicircles. Referring to FIG. 5, the lithium metal battery of Example 2 was found to have a slightly reduced interfacial resistance compared to the lithium metal battery of Comparative Example 1.

Evaluation Example 4

Charge-Discharge Characteristics (Discharge Capacity)

Examples 1, 14 and 15, and Comparative Examples 1 and 4

Each of the lithium metal batteries of Example 1 and Comparative Examples 1 and 4 was charged at about 25° C. with a constant current of 0.1 C rate to a voltage of about 4.40 Volts (V) (with respect to Li), and then with a constant voltage of 4.40 V until a cutoff current of 0.05 C rate, and was then discharged with a constant current of 0.1 C rate to a voltage of about 3.0 V (with respect to Li) (Formation process, $1^{st}$ cycle). This cycle of charging and discharging was performed two times more to complete the formation process.

Each of the lithium batteries after the formation process was charged at room temperature (25° C.) with a constant current of 0.7 C to a voltage of about 4.4 V (with respect to Li) and then discharged with a constant current of 0.5 C until a cutoff voltage of 3.0 V. The above cycle of charging and discharging was performed 100 times in total. The capacity retention of each of the lithium metal batteries was calculated using Equation 1.

Capacity retention (%)=($100^{th}$ cycle discharge capacity/$1^{st}$ cycle discharge capacity)×100%   Equation 1

Figure 6:
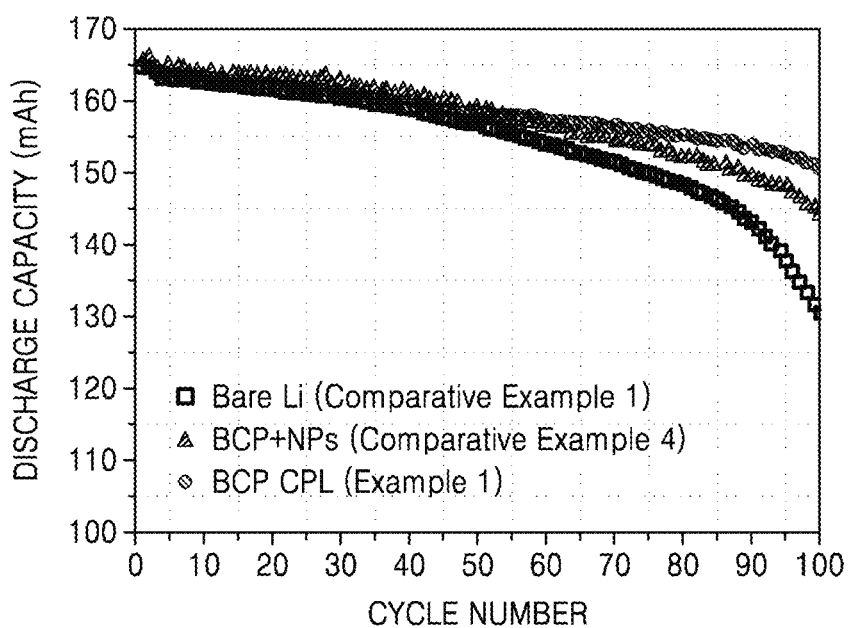
FIG. 6 is a graph of discharge capacity (milliampere hours per gram, mAh/g) versus cycle number, illustrating a change in discharge characteristics per cycle of lithium metal batteries of Example 1 and Comparative Examples 1 and 4.
Figure 7:
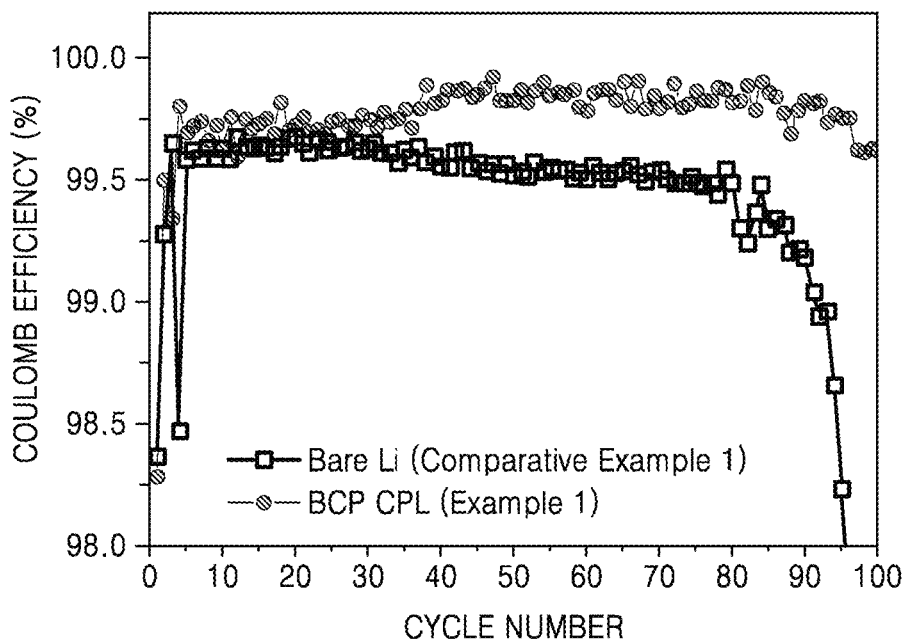
FIG. 7 is a graph of Coulombic efficiency (percent, %) versus cycle number of the lithium metal batteries of Example 1 and Comparative Examples 1 and 4.

The results of evaluating charge-discharge characteristics of the lithium metal batteries of Example 1 and Comparative Examples 1 and 4 are shown in FIGS. 6 and 7. Changes in discharge capacity in the lithium metal batteries of Example 1 and Comparative Examples 1 and 4 during 100 times of repeated charge/discharge cycles are shown in FIG. 6, and the coulombic efficiencies of the lithium metal batteries are shown in FIG. 7.

Referring to FIGS. 6 and 7, the lithium metal battery of Example 1 was found to have an improved capacity retention compared to the lithium metal batteries of Comparative Examples 1 and 4.

The capacity retention values of the lithium metal batteries of Examples 14 and 15 were also measured according to the same method for evaluating the capacity retention values of the lithium metal batteries of Example 1, and Comparative Examples 1 and 4.

The lithium metal batteries of Examples 14 and 15 were found to have a similar capacity retention values to that of the lithium metal battery of Example 1.

Evaluation Example 5

Tensile Modulus and Elongation

After the protective layer-forming composition prepared in Example 1 was cast on a substrate, tetrahydrofuran (THF) in the resulting cast product was slowly evaporated at about 25° C. for about 24 hours in an argon glove box, followed by drying under vacuum at about 25° C. for about 24 hours, thereby forming a protective layer in membrane form. The protective layer had a thickness of about 50 μm.

A tensile modulus of the protective layer was measured using a DMA800 (available from TA Instruments). Protective layer samples for the tensile modulus measurement were prepared according to the ASTM standard D412 (Type V specimens). The tensile modulus is also known as Young's modulus.

Figure 8:
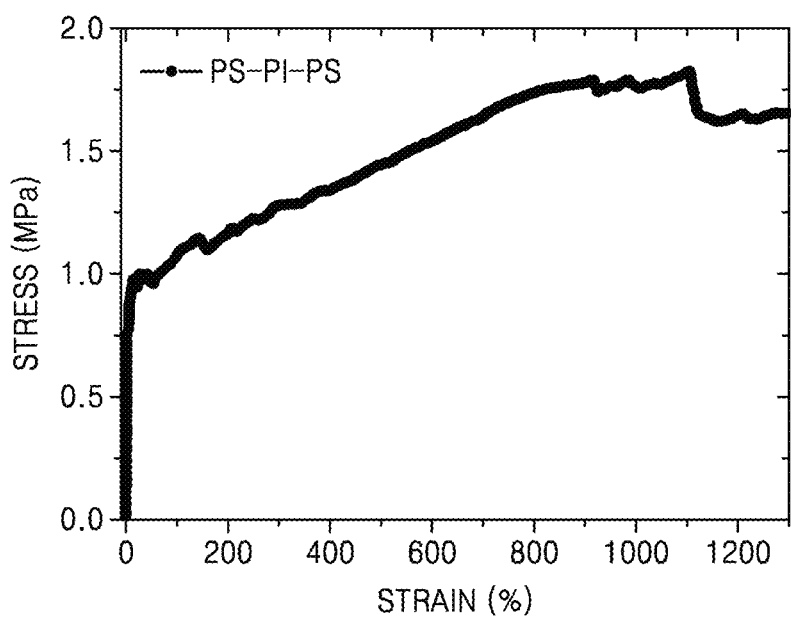
FIG. 8 is a graph of stress (megaPascals, MPa) versus strain (percent, %), which is a stress-strain curve of a protective layer formed according to Example 1.

Variations in strain with respect to stress in the protective layer were measured at about 25° C., a relative humidity of about 30%, and a rate of 5 millimeters per minute (mm/min). The results are shown in FIG. 8. The tensile modulus of the protective layer was calculated from the slope of a stress-strain curve thereof, and the elongation of the protective layer was obtained based on the strain values.

As a result, the protective layer prepared according to Example 1 was found to have good tensile modulus and elongation characteristics, and thus may be used to effectively suppress volumetric change of the lithium metal anode and growth of lithium dendrite.

Evaluation Example 6

Charge-Discharge Characteristics (Rate Capability)

1) Example 2 and Comparative Example 1

Each of the lithium metal batteries of Example 2 and Comparative Example 1 was charged at about 25° C. with a constant current of 0.1 C rate to a voltage of about 4.4 V (with respect to Li), and then with a constant voltage of 4.4 V until a cutoff current of 0.05 C rate, and was then discharged with a constant current of 0.1 C rate to a voltage of about 3.0 V (with respect to Li). This cycle of charging and discharging was performed two times more to complete the formation process.

Subsequently, the formation process was followed by charging with a constant current (A1) and constant voltage (4.4 V, 0.05 C cut-off) according to Conditions 1 to 5 of Table 2, a rest for about 10 minutes, and then discharging with a constant current (A2) according to Conditions 1 to 5 of Table 2 to a voltage of 3.0 V. In other words, charging and discharging were performed under the five different conditions as shown in Table 2 to evaluate the rate capability of each of the lithium metal batteries.

TABLE 2

|  | Condition 1 | Condition 2 | Condition 3 | Condition 4 | Condition 5 | Condition 6 |
|---|---|---|---|---|---|---|
| Current A1 (C) | 0.2 | 0.7 | 0.7 | 0.7 | 0.7 | 0.7 |
| Current A2 (C) | 0.2 | 0.2 | 0.5 | 1.0 | 1.5 | 2.0 |

Figure 9:
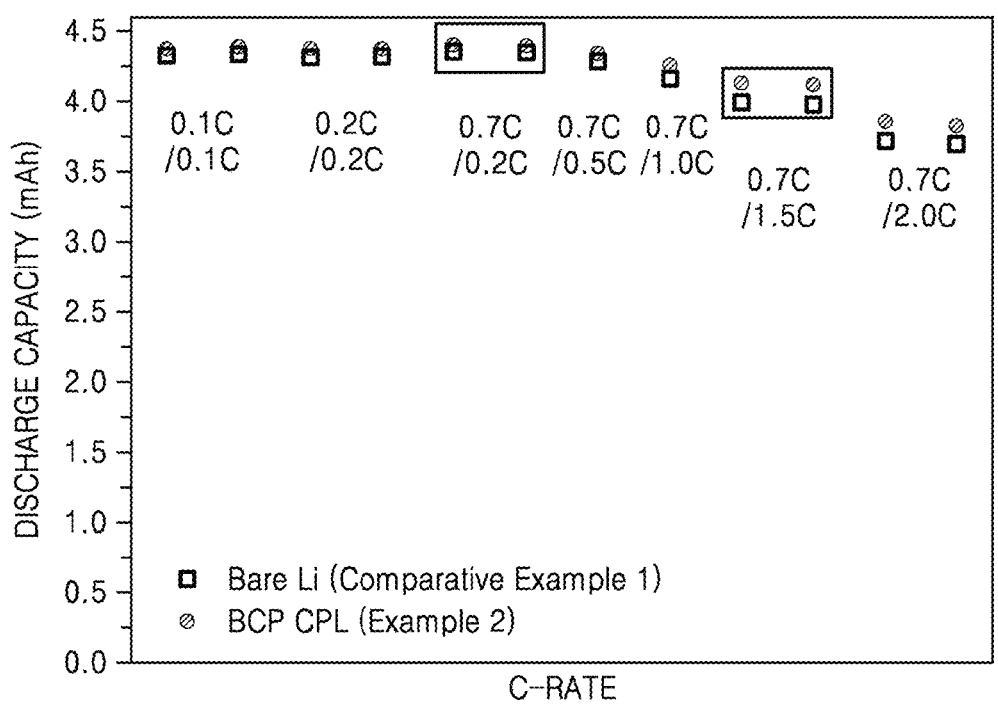
FIG. 9 is a histogram of discharge capacity (milliampere hours per gram, mAh/g) at selected rates, illustrating rate capabilities of lithium metal batteries of Example 1 and Comparative Example 1.

The rate capabilities of the lithium metal batteries of Example 2 and Comparative Example 1 are shown in FIG. 9.

Referring to FIG. 9, the lithium metal battery of Example 2 was found to have improved rate capability compared to the lithium metal battery of Comparative Example 1.

2) Examples 2, 11, and 12, and Comparative Examples 1 and 4

Each of the lithium metal batteries of Examples 2, 11 and 12 and Comparative Examples 1 and 4 was charged at about 25° C. with a constant current of 0.1 C rate to a voltage of about 4.4 V (with respect to Li), and then with a constant voltage of 4.4 V until a cutoff current of 0.05 C rate, and was then discharged with a constant current of 0.1 C rate to a voltage of about 3.0 V (with respect to Li). This cycle of charging and discharging was performed two times more to complete the formation process.

Subsequently, the formation process was followed by charging with a constant current (0.7 C) and constant voltage (4.4 V, 0.05 C cut-off), a rest for about 10 minutes, and then discharging with a constant current (0.2 C or 1.5 C) to a voltage of 3.0 V. In other words, the rate capability of each of the lithium metal batteries was evaluated with varying discharge rates of 0.2 C and 1.5 C. The results are shown in Table 3. A C-rate refers to a cell discharge rate that is obtained by dividing a total capacity of a cell by a total discharge time. The rate capabilities in Table 3 were calculated using Equation 2.

Rate capability (%)=[(Discharge capacity at 1.5 C)/(Discharge capacity at 0.2 C)]×100%   Equation 2

TABLE 3

| Example | Rate capability (%) (1.5 C/0.2 C) |
|---|---|
| Example 2 | 94.25 |
| Example 11 | 92 |
| Example 12 | 94.25 |
| Comparative Example 1 | 91 |
| Comparative Example 4 | 91 |

Referring to Table 3, the lithium metal batteries of Examples 2, 11, and 12 were found to have improved rate capabilities compared to the lithium metal batteries of Comparative Examples 1 and 4.

Evaluation Example 7

Lithium Ion Transference Number

Examples 2, 11, and 12, and Comparative Examples 1 and 4

Li/Li symmetric cells were manufactured using lithium metal thin films with the protective layers prepared in Examples 2, 11, and 12 thereon, respectively, and an electrolyte. The electrolyte used was a liquid electrolyte including 1.0 M LiFSI dissolved in a mixed solvent of 1.2-dimethoxyethane (DME) and 1,1,2,2-tetrafluoroethyl 2,2,3,3-tetrafluoropropyl ether (TTE) in a volume ratio of about 2:8.

For comparison, Li/Li symmetric cells were manufactured using the lithium metal thin film of Comparative Example 1 and the lithium metal anode of Comparative Example 4, respectively, and the electrolyte.

Lithium ion transference number ($t_{Li+}$) of each of the symmetric cells at about 25° C. was evaluated. Some of the results are shown in Table 4.

Lithium ion transference numbers of the symmetric cells were calculated using Equation 3. A current decay with time with respect to an impedance and an input voltage of a lithium symmetric cell were measured and used to calculate the lithium ion transference number (see, for example, Electrochimica Acta 93 (2013) 254, the content of which is incorporated herein in its entirety by reference).

$$t_{Li+} = \frac{i_{ss}(\Delta V - i_o R^0)}{i_o(\Delta V - i_{ss} R^{ss})} \quad \text{Equation 3}$$

In Equation 3,
$i_o$ indicates an initial current,
$i_{ss}$ indicates a steady state current,
$R^0$ indicates an initial resistance,
$R^{ss}$ indicates a steady state resistance, and
$\Delta V$ indicates a voltage difference.

TABLE 4

| Example | Lithium ion transference number ($t_{Li+}$) |
|---|---|
| Example 2 | 0.75-0.80 |
| Example 11 | 0.67-0.70 |
| Example 12 | 0.74-0.76 |
| Comparative Example 1 | 0.56-0.58 |
| Comparative Example 4 | 0.62-0.65 |

Referring to Table 4, the lithium metal batteries having the protective layers of Examples 2, 11, and 12 were found to have a larger lithium ion transference number ($t_{Li+}$) and consequentially have improved lithium ion mobility, compared to the lithium metal batteries of Comparative Examples 1 and 4.

Evaluation Example 8

Cell Voltage

A Li/Li symmetric cell was manufactured using the lithium metal thin film with the protective layer prepared in Example 2 thereon, and an electrolyte. The electrolyte used was a liquid electrolyte including 1.0 M LiFSI dissolved in a mixed solvent of 1.2-dimethoxyethane (DME) and 1,1,2,2-tetrafluoroethyl 2,2,3,3-tetrafluoropropyl ether (TTE) in a volume ratio of about 2:8.

For comparison, a Li/Li symmetric cell was manufactured using the lithium metal thin film of Comparative Example 1 and the electrolyte.

Each of the Li/Li symmetric cells were charged and discharged with a constant current of 1 C/1 C in a voltage range of about −1 V to about 1 V.

Figure 10:
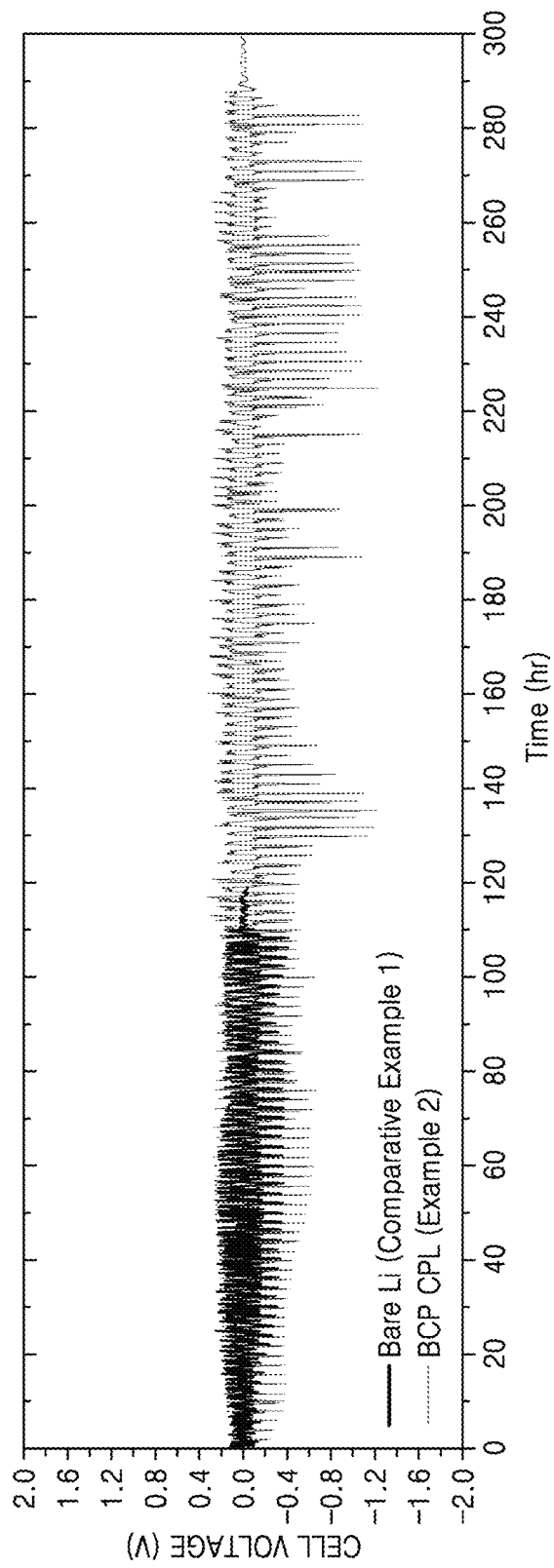
FIG. 10 is a graph of cell voltage (Volts, V) versus time (hours, hr), showing cell voltages of a symmetric cell including a lithium metal anode with a protective layer prepared according to Example 2 and a symmetric cell including a lithium metal thin film according to Comparative Example 1.

Changes in cell voltage with respect to time in the Li/Li symmetric cells are shown in FIG. 10.

Referring to FIG. 10, the Li/Li symmetric cell using the protective layer of Example 2 was found to have a reduced cell voltage change with time, compared to the Li/Li symmetric cell using the lithium metal thin film of Comparative Example 1.

As described above, according to the one or more embodiments, a lithium metal battery including a protective layer on a lithium metal anode as described above may effectively suppress growth of lithium dendrite on a surface of the lithium metal anode, and thus have an increased lithium deposition density, a reduced interfacial resistance between the lithium metal anode and the protective layer, and an increased lithium ion mobility. Therefore, the lithium metal battery may have improved rate capability and improved lifetime.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made herein without departing from the spirit and scope as defined by the following claims.

What is claimed is:

1. A lithium metal battery comprising:
   a lithium metal anode;
   a protective layer disposed on the lithium metal anode, the protective layer comprising: i) a polymer and ii) a metal salt comprising a Group 1 or a Group 2 element and a nitrogen-containing additive;
   a cathode comprising lithium cobalt oxide, lithium nickel cobalt manganese oxide, lithium nickel cobalt aluminum oxide, lithium iron phosphate, lithium manganese oxide, or a combination thereof; and
   a liquid electrolyte disposed between the protective layer and the cathode, the liquid electrolyte comprising an organic solvent,
   wherein the metal salt and a nitrogen-containing additive comprising a Group 1 element or Group 2 element are insoluble in the organic solvent of the liquid electrolyte,
   wherein the metal salt comprises
      at least one selected from a Group 1 element or Group 2 element selected from Cs, Rb, K, Ba, Sr, Ca, and Mg,
      $NaNO_3$, or
      a combination thereof; and
   wherein the nitrogen-containing additive is at least one selected from an inorganic nitrate, an organic nitrate, an inorganic nitrite, an organic nitrite, an organic nitro compound, an organic nitroso compound, an N—O compound, and lithium nitride, and
   wherein the metal salt has a solubility of less than 100 parts per million per liter of the organic solvent.

2. The lithium metal battery of claim 1, wherein the metal salt is at least one selected from Cs(bis(trifluoromethylsulfonyl)imide), $CsNO_3$, $CsPF_6$, Cs(bis(fluorosulfonyl)imide), $CsAsF_6$, $CsClO_4$, $CsBF_4$, Rb(bis(trifluoromethylsulfonyl)imide), $RbNO_3$, $RbPF_6$, Rb(bis(fluorosulfonyl)imide), $RbAsF_6$, $RbClO_4$, $RbBF_4$, K(bis(trifluoromethylsulfonyl)imide), $KNO_3$, $KPF_6$, K(bis(fluorosulfonyl)imide), $KAsF_6$, $KClO_4$, $KBF_4$, Na(bis(trifluoromethylsulfonyl)imide), $Ba(bis(trifluoromethylsulfonyl)imide)_2$, $Ba(NO_3)_2$, $Ba(PF_6)_2$, $Ba(bis(fluorosulfonyl)imide)_2$, $Ba(AsF_6)_2$, $Ba(ClO_4)_2$, $Ba(BF_4)_2$, $Sr(bis(trifluoromethylsulfonyl)imide)_2$, $Sr(NO_3)_2$, $Sr(PF_6)_2$, $Sr(bis(fluorosulfonyl)imide)_2$, $Sr(AsF_6)_2$, $Sr(ClO_4)_2$, $Sr(BF_4)_2$, $Ca(bis(trifluoromethylsulfonyl)imide)_2$, $Ca(NO_3)_2$, $Ca(PF_6)_2$, $Ca(bis(fluorosulfonyl)imide)_2$, $Ca(AsF_6)_2$, $Ca(ClO_4)_2$, $Ca(BF_4)_2$, $Mg(bis(trifluoromethylsulfonyl)imide)_2$, $Mg(NO_3)_2$, $Mg(PF_6)_2$, $Mg(bis(fluorosulfonyl)imide)_2$, $Mg(AsF_6)_2$, $Mg(ClO_4)_2$, and $Mg(BF_4)_2$.

3. The lithium metal battery of claim 1, wherein the inorganic nitrate is at least one selected from lithium nitrate, potassium nitrate, cesium nitrate, barium nitrate, and ammonium nitrate,
   the organic nitrate is at least one selected from a C1 to C20 dialkyl imidazolium nitrate, guanidine nitrate, ethyl nitrate, propyl nitrate, butyl nitrate, pentyl nitrate, and octyl nitrate,
   the organic nitrite is at least one selected from ethyl nitrite, propyl nitrite, butyl nitrite, pentyl nitrite, and octyl nitrite,
   the organic nitro compound is at least one selected from nitromethane, nitropropane, nitrobutane, nitrobenzene, dinitrobenzene, nitrotoluene, dinitrotoluene, and nitropyridine, and
   the N—O compound is at least one selected from pyridine N-oxide, C1 to C20 alkylpyridine N-oxide, and tetramethyl piperidine N-oxyl.

4. The lithium metal battery of claim 1, wherein an amount of the metal salt and the nitrogen-containing additive in the protective layer is from about 0.1 part to about 100 parts by weight, based on 100 parts by weight of the polymer.

5. The lithium metal battery of claim 1,
   wherein the protective layer comprises the metal salt and the nitrogen-containing additive,
   wherein an amount of the metal salt is from about 0.01 part to about 99.99 parts by weight, based on 100 parts by weight of the polymer, and
   wherein an amount of the nitrogen-containing additive is from about 0.01 part to about 99.99 parts by weight, based on 100 parts by weight of the polymer.

6. The lithium metal battery of claim 1,
   wherein the protective layer comprises the metal salt and the nitrogen-containing additive, and
   wherein a mixed weight ratio of the metal salt to the nitrogen-containing additive is from about 1:9 to about 9:1.

7. The lithium metal battery of claim 1, wherein the polymer is at least one copolymer selected from a homopolymer, a block copolymer, and a graft copolymer.

8. The lithium metal battery of claim 7, wherein the homopolymer is at least one selected from polyvinyl alcohol, polymethylmethacrylate, polymethylacrylate, polyethylmethacrylate, polyethylacrylate, polypropylmethacrylate, polypropylacrylate, polybutylacrylate, polybutylmethacrylate, polypentylmethacrylate, polypentylacrylate, polycyclohexylmethacrylate, polycyclohexylacrylate, polyhexylmethacrylate, polyhexylacrylate, poly(glycidylacrylate), polyglycidylmethacrylate, and polyvinylidene fluoride.

9. The lithium metal battery of claim 1, wherein the polymer is a block copolymer comprising a first polymer block and a second polymer block,
  wherein the first polymer block comprises at least one selected from polystyrene, hydrogenated polystyrene, polymethacrylate, poly(methyl methacrylate), polyvinylpyridine, polyvinyl cyclohexane, polyimide, polyamide, polyethylene, polybutylene, polypropylene, poly(4-methyl 1-pentene), poly(butylene terephthalate), poly(isobutyl methacrylate), poly(ethylene terephthalate), polydimethylsiloxane, polyvinylidene fluoride, polymaleic acid, poly(maleic anhydride), polymethacrylic acid, poly(tert-butyl vinyl ether), poly(cyclohexyl methacrylate), poly(cyclohexyl vinyl ether), and polydivinylbenzene; or a polymer comprising at least two repeating units of these polymers, and
  wherein the second polymer block is at least one selected from polyethylene oxide, polypropylene oxide, polymethylmethacrylate, polyethylmethacrylate, polydimethylsiloxane, polyacrylic acid, polymethacrylic acid, polymethylacrylate, polyethylacrylate, poly-2-ethylhexyl acrylate, polybutyl methacrylate, poly-2-ethylhexylmethacrylate, poly(decyl acrylate), polyethylene vinyl acetate, polyimide, polyamine, polyamide, poly(C1 to C20 alkyl carbonate), polynitrile, polyphosphazine, polyolefin, polydiene, polyisoprene, polybutadiene, polychloroprene, polyisobutylene, polyurethane, polyethylene, polybutylene, and polypropylene.

10. The lithium metal battery of claim 1, wherein the lithium metal battery further comprises an ion-conductive thin film disposed between the lithium metal anode and the protective layer.

11. The lithium metal battery of claim 1, wherein an amount of the at least one of a metal salt and a nitrogen-containing additive in the protective layer increases in a direction from the liquid electrolyte towards the lithium metal anode.

12. The lithium metal battery of claim 1, wherein the protective layer further comprises at least one selected from an inorganic particle, an ionic liquid, a polymer ionic liquid, and an oligomer.

13. The lithium metal battery of claim 12, wherein the inorganic particle comprises at least one selected from $SiO_2$, $TiO_2$, ZnO, $Al_2O_3$, $BaTiO_3$, a cage-structured silsesquioxane, and a metal-organic framework.

14. The lithium metal battery of claim 12, wherein an amount of the inorganic particle is from about 1 part to about 40 parts by weight, based on 100 parts by weight of the polymer.

15. The lithium metal battery of claim 12, wherein the ionic liquid is at least one compound each comprising:
  i) a cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and
  ii) an anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $PF_6^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

16. The lithium metal battery of claim 1,
  wherein the liquid electrolyte comprises a lithium salt and an organic solvent, and
  wherein the organic solvent comprises at least one selected from ethylene carbonate, dimethyl carbonate, diethyl carbonate, ethylmethyl carbonate, fluoroethylene carbonate, 1,2-dimethoxy ethane, 1,2-diethoxyethane, dimethylene glycol dimethyl ether, trimethylene glycol dimethyl ether, triethylene glycol dimethylether, tetraethylene glycol dimethyl ether, polyethylene glycol dimethyl ether, succinonitrile, sulfolane, dimethyl sulfone, ethyl methyl sulfone, diethyl sulfone, adiponitrile, and 1,1,2,2-tetrafluoroethyl 2,2,3,3-tetrafluoropropyl ether.

17. The lithium metal battery of claim 1, wherein the protective layer has a thickness of about 1 micrometer to about 20 micrometers.

18. The lithium metal battery of claim 1,
  wherein the nitrogen-containing additive is at least one selected from $LiNO_3$ and $Li_3N$, and
  wherein the metal salt is at least one selected from cesium bis(trifluoromethylsulfonyl)imide, $CsNO_3$, $CsPF_6$, $CsFSI^-$, $CsAsF_6$, $CsClO_4$, and $CsBF_4$.

19. The lithium metal battery of claim 1, wherein the lithium metal battery further comprises at least one selected from a separator, a solid electrolyte, a gel electrolyte, and a polymer ionic liquid.

20. A method of protecting the lithium metal anode as defined in claim 1, comprising:
  combining the metal salt comprising a Group 1 or a Group 2 element and a nitrogen-containing additive with the organic solvent to obtain a protective layer-forming composition;
  applying the protective layer-forming composition to a lithium metal anode; and
  drying the applied protective layer-forming composition to form a protective layer
  wherein the metal salt and the nitrogen-containing additive comprising a Group 1 element or Group 2 element are insoluble in the organic solvent of the liquid electrolyte,
  wherein the metal salt comprises
    at least one selected from a Group 1 element or Group 2 element selected from Cs, Rb, K, Ba, Sr, Ca, and Mg,
    $NaNo_3$, or
    a combination thereof; and
  wherein the nitrogen-containing additive is at least one selected from an inorganic nitrate, an organic nitrate, an inorganic nitrite, an organic nitrite, an organic nitro compound, an organic nitroso compound, an N—O compound, and lithium nitride, and wherein the metal salt has a solubility of less than 100 parts per million per liter of the organic solvent.

21. A protective layer prepared according to the method of claim 20.

22. The lithium metal battery of claim 2, wherein the metal salt comprises at least one of $Cs^+$ and $Rb^+$.

23. The lithium metal battery of claim 2, wherein the metal salt comprises bis(fluorosulfonyl)imide.

* * * * *